(12) United States Patent
Mehr et al.

(10) Patent No.: US 8,533,660 B2
(45) Date of Patent: Sep. 10, 2013

(54) ANNOTATION OF MODELS FOR MODEL-DRIVEN ENGINEERING

(75) Inventors: Farid Mehr, Filderstradt (DE); Mathias Fritzsche, Neukirchen (DE)

(73) Assignee: SAP AG, Walldorf (DE)

(*) Notice: Subject to any disclaimer, the term of this patent is extended or adjusted under 35 U.S.C. 154(b) by 1482 days.

(21) Appl. No.: 11/944,223

(22) Filed: Nov. 21, 2007

(65) Prior Publication Data

US 2009/0132562 A1    May 21, 2009

(51) Int. Cl.
*G06F 9/44* (2006.01)
(52) U.S. Cl.
USPC .......................................................... 717/104
(58) Field of Classification Search
USPC ................. 717/136, 146, 104, 141, 117, 167;
704/9; 707/999.004, 103 R; 709/232
See application file for complete search history.

(56) References Cited

U.S. PATENT DOCUMENTS

| | | | |
|---|---|---|---|
| 2004/0158455 A1* | 8/2004 | Spivack et al. | 704/9 |
| 2006/0242195 A1* | 10/2006 | Bove et al. | 707/103 R |
| 2007/0234314 A1* | 10/2007 | Godwin et al. | 717/136 |
| 2008/0276229 A1* | 11/2008 | Hawkins et al. | 717/136 |
| 2010/0083212 A1 | 4/2010 | Fritzsche et al. | |

OTHER PUBLICATIONS

Brucker et al, "Metamodel-Based UML Notations for Domain-Specific Languages", 4th International Workshop on Language Engineering (Atem07), Oct. 1, 2007, pp. 1-15 <brucker_DSL07.pdf>.*
Omgeaisig, "UML Profile and Interchange Models for Enterprise Application Integration(EAI)", Sep. 17, 2001, 258 pg, <UML_EAI_01.pdf>.*
Brockmans et al, "A Metamodel and UML Profile for Networked Ontologies—the Complete Reference", May 2006, p. 1-36 <UMLProfile06.pdf>.*
Xu et al,"Performance Analysis of a Software Design using the UML Profile for Schedulability, Performance and Time", p. 1-18, Computer Performance Evaluation, vol. 2794, 2003 <UMLTool_Xu_2003.pdf>.*
"Aspectj crosscutting object for better modularity", Retrieved on Nov. 20, 2007, 4 pages. Available at: http://web.archive.org/web/20070105030648/http://www.eclipse.org/aspectj/.
"Event-driven process chain", Wikipedia, Retrieved on Nov. 26, 2007, 4 pages. Available at: http://en.wikipedia.org/wiki/Event-driven_Process_Chains.
Extended European Search Report received for the European Patent Application No. 08012510.7, mailed on Mar. 2, 2009, pp. 1-6.
"Home of Fundamental Modeling Concepts", Retrieved on Nov. 26, 2007, 1 page. Available at: http://www.fmc-modeling.org/.
"UML Profile for Schedulability, Performance, and Time Specification", OMG Group, Version 1.1, Jan. 2005, 235 pages.
Abouzahra, Anas et al., "A Practical Approach to Bridging Domain Specific Languages with UML Profiles", Proceedings of the Best practices for model driven software development at OOPSLA, San Diego, vol. 5, Oct. 16, 2005, pp. 1-8.

(Continued)

*Primary Examiner* — Tuan A Vu
(74) *Attorney, Agent, or Firm* — Brake Hughes Bellermann LLP

(57) ABSTRACT

A query interpreter may be configured to query a model repository to obtain one or more elements of at least one model associated with a software application and stored in the model repository. A profile reader may be configured to read, from a profile repository, at least one profile meta-model that is associated with at least one annotation; and a profile integrator may be configured to annotate the one or more elements with the at least one annotation to obtain an annotated model.

14 Claims, 17 Drawing Sheets

(56) References Cited

OTHER PUBLICATIONS

Gertz, Michael, "Oracle/SQL Tutorial", Revised Version 1.01, Jan. 2000, 66 pages.

Heckel, Reiko et al., "Towards a UML Profile for Service-Oriented Architectures", Preprint submitted to Elsevier Science, Jun. 20, 2003, pp. 1-6.

Johnston, Simon, "UML 2.0 Profile for Software Services Pragmatic Modeling for SOA", IBM Rational, 2006, 22 pages.

Jouault, Frederic, et al., "Transforming Models with ATL", Satellite Events at the models 2005 Conference Lecture Notes in Computer science, LNCS, Springer, Berlin, DE, ATLAS Group, INRIA & LINA, University of Nantes, vol. 3844, Jan. 1, 2006, 30 pages.

Juerjens, Jan, "Using UMLsec and goal trees for secure systems development", Proceedings of the 2002 ACM symposium on Applied computing, 2002, 5 pages.

Riva, Cladio, et al., "UML-based reverse engineering and model analysis approaches for software architecture maintenance", Proceedings of the 20th IEEE International Conference on Software Maintenance, Sep. 11, 2004, pp. 1-10.

Russell, Nick, et al., "Workflow Control-Flow Patterns", A Revised View BPM Center Report BPM-06-22, Sep. 2006, pp. 1-77.

Vaziri, Mandana, et al., "Some Shortcomings of OCL, the Object Constraint Language of UML", MIT Laboratory for Computer Science, Dec. 7, 1999, pp. 1-17.

Zhu, Liming, et al., "UML Profiles for Design Decisions and Non-Functional Requirements", 53rd Second Workshop on Sharing and Reusing Architectural Knowledge—Architecture, Rationale, and Design Intent, SHARK/ADI '07: ICSE Workshops 2007, SHARK/ADI, May 2007, 7 pages.

Mantell, Keith, "From UML to BPEL, Model Driven Architecture in a Web Services World", DeveloperWorks, Sep. 9, 2003, 9 pages.

Houmb, Siv Hilde, et al., "Toward a UML Profile for Model-Based Risk Assessment", Telenor R & D, Norway, 2002, 12 pages.

Greenfield, Jack, "UML profile for EJB", Public Draft, Rational Software Corporation, May 25, 2001, pp. 1-75.

Inverardi, P., et al., "Performance Evaluation of A Software Architecture: A Case Study", 1998, 10 pages.

"OMG Unified Modeling Language (OMG UML), Superstructure, V2.1.2", Nov. 2007, 738 pages.

"Unified Modeling Language: Superstructure", OMG, Version 2.1.1 (with Change Bars), Feb. 3, 2007, 732 pages.

"Unified Modeling Language (UML) Specification: Infrastructure", OMG, Version 2.0, Finalized Convenience Document, Nov. 2004, 226 pages.

"ATL: Atlas Transformation Language", Atlas Group Lina & Inria Nantes, ATL User Manual—version 0.7, Feb. 2006, 95 pages.

\* cited by examiner

ANNOTATION OF MODELS FOR MODEL-DRIVEN ENGINEERING

TECHNICAL FIELD

This description relates to model-based processes.

BACKGROUND

Model-driven engineering and related concepts relate, for example, to the use of formalized models to design, manage, implement, and modify software applications and other processes. Such models provide a formalized abstraction of desired properties and behaviors (e.g., of software components), and this abstraction provides, among other benefits, an ability of a designer or other user to understand, explain, create, or implement the software application(s) in a manner that is consistent, logical, and efficient. Further, the use of such models allows for later modifications of the resulting software application(s), in a straight-forward manner that minimizes undesired or unexpected consequences of the modifications.

Models at a given layer of abstraction may be extended in order to provide a desired feature or functionality for an associated software application, such as when an otherwise generic model/application is to be implemented in a more specific context or domain. Such extensions may themselves be formalized, so that designers or other users may add desired features or functionalities to models in a straight-forward, consistent manner. For example, models expressed in the Unified Modeling Language (UML) may be associated with a number of profiles, e.g., a metamodel providing extensions to the language it effectively extends (e.g., UML). The extensions can provide domain specific information. For example, a UML model may include an element that is associated with a particular software component (e.g., a software component associated with processing a credit card transaction). Then, for example, a designer may wish to associate a security profile to the element, in order to provide a desired level of security for the credit card transaction. Since the security profile itself may be pre-defined and substantially uniform, the designer or other user may also apply the same security profile to other elements of the example UML model, or to (elements of) other UML models entirely.

In practice, however, it may occur that one or more software applications may each be associated with a large number of models, and/or each model may include a large number of elements. Consequently, in these and other examples, it may be difficult or impractical to provide a specified profile for desired models/elements of a software application.

SUMMARY

According to one general aspect, a query interpreter may be configured to query a model repository to obtain one or more elements of at least one model associated with a software application and stored in the model repository. A profile reader may be configured to read, from a profile repository, at least one profile meta-model that is associated with at least one annotation; and a profile integrator may be configured to annotate the one or more elements with the at least one annotation to obtain an annotated model.

According to another general aspect, a model repository may be queried to obtain one or more elements of at least one model associated with a software application and stored in the model repository. At least one profile meta-model may be read from a profile repository. At least one annotation associated with the profile meta-model may be determined, and the one or more elements may be annotated with the at least one annotation to obtain an annotated model.

According to another general aspect, a computer program product may be tangibly embodied on a computer-readable medium and may include executable code that, when executed, is configured to cause a data processing apparatus to query a model repository to obtain one or more elements of at least one model associated with a software application and stored in the model repository, read, from a profile repository, at least one profile meta-model, determine at least one annotation associated with the profile meta-model, and annotate the one or more elements with the at least one annotation to obtain an annotated model.

The details of one or more implementations are set forth in the accompanying drawings and the description below. Other features will be apparent from the description and drawings, and from the claims.

DETAILED DESCRIPTION

Figure 1:
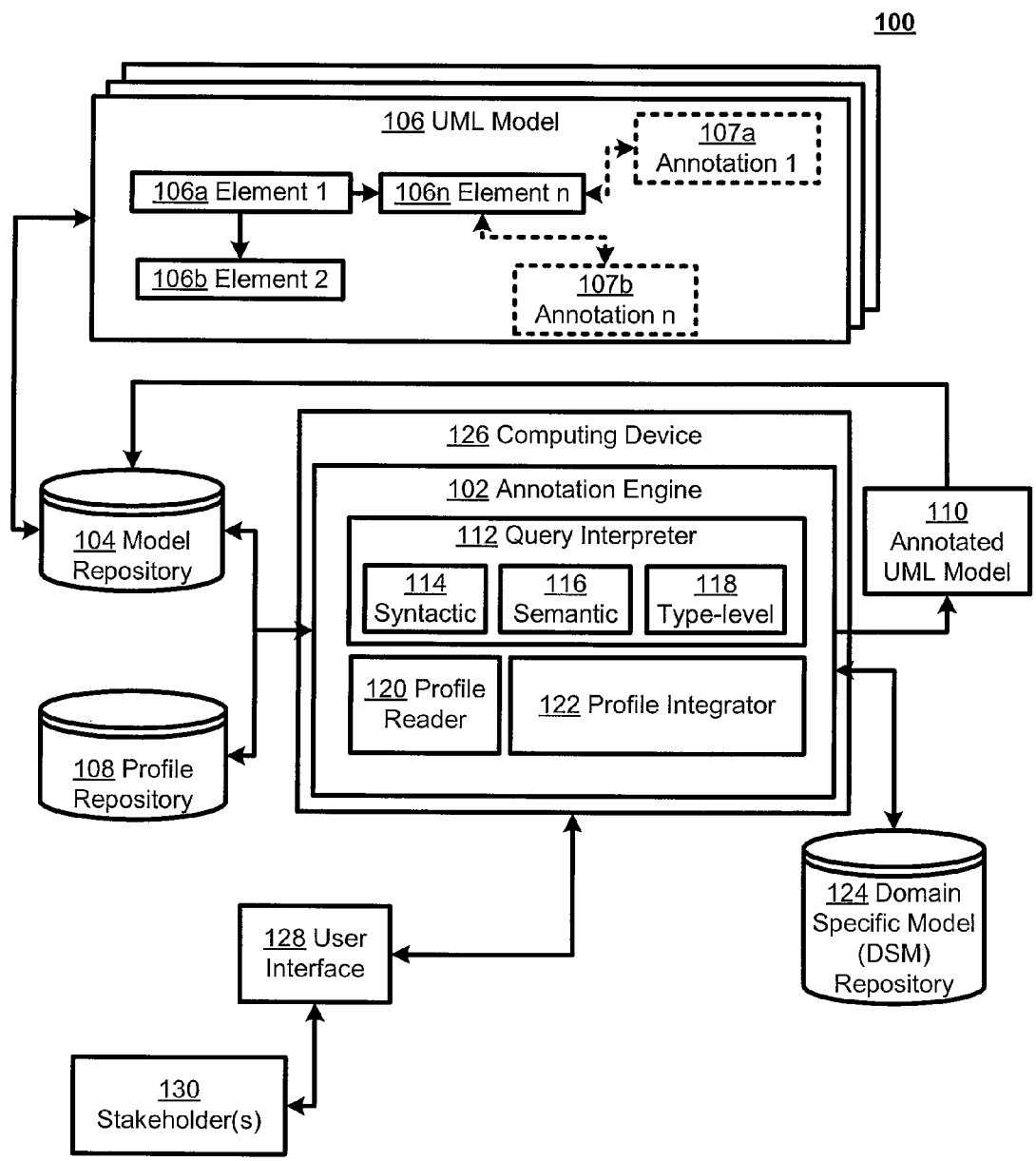
FIG. 1 is a block diagram of a system for annotation of models for model-driven engineering.

FIG. 1 is a block diagram of a system 100 for annotation of models for model-driven engineering. In the example of FIG. 1, an annotation engine 102 may be configured to query a model repository 104 to obtain desired elements and/or desired models (e.g., a model 106, shown in FIG. 1 as a UML model). The annotation engine 102 also may access a profile repository 108 containing a number of possible profiles to be provided to the UML model 106 (e.g., to elements thereof).

Then, the annotation engine 102 may extend or modify the obtained models/elements using the accessed profiles, to thereby obtain an annotated model 110. The annotated model 110 may then be used to implement an associated software application (not illustrated in FIG. 1), and/or may be returned to the model repository 104 for further annotation thereof, as desired.

Thus, the annotation engine 102 allows for convenient and flexible access to the model repository 104 and to the profile repository 108, even when the repositories 104, 108 contain large numbers of models and profiles, respectively. Consequently, for example, designers or other users may easily obtain only those models/elements that are desired for annotation thereof. Further, the resulting annotation(s) may proceed in an automatic, intuitive fashion. As a result, designers or other users may provide the annotated model 110 as a more domain-specific version of the original, more abstracted model 106, and, if necessary, may also later modify the annotated model 110 (e.g., change the annotation or add a new annotation/profile) in a straight-forward fashion.

In general, models in the model repository 104, such as the model 106, may include any models formed with a modeling or meta-modeling language that is associated with a formalized profile model or meta-model, which itself is presumed to be available, e.g., within the profile repository 108. In the examples provided herein, the models are assumed to be UML models, for the sake of clarity and consistency in the description. However, many other modeling languages may exist and may either be associated with a corresponding formalized profile meta-model, or may have the possibility of such a profile meta-model being developed. Non-limiting examples of other such modeling languages may include the Business Process Modeling Notation (BPMN), Business Process Execution Language (BPEL), Web Services BPEL (WSBPEL), Event-Driven Process Chain(s) languages, and languages in the area of Fundamental Modeling Concepts.

The profile meta-models in the profile repository 108 may allow, for example, for either vertical or horizontal profiling. In this context, vertical profiling may refer to annotation of models or model elements within a defined context, arena, or domain. For example, the model repository 106 may include a meta-model from which a first UML model for a first software application and a second UML model for a second software application are designed/implemented. In this context, vertical profiling may occur for the first model/application by annotating elements within that context, e.g., to further specify how associated software components may be implemented. For example, vertical profiling of the first model may specify that a software component should be implemented using Common Object Request Broker Architecture (CORBA), while vertical profiling of the second model may specify that a similar or identical software component in that context should be implemented using J2EE (Java 2 Enterprise Edition). Thus, such annotations are independent of one another within their respective context/domains.

Conversely, horizontal profiling may be understood to apply across a number of domains. For example, in the above scenario, horizontal profiling may include providing a certain security annotation to both of the first and second software applications (and associated models), so that, e.g., both of the referenced components use a designated security mechanism (e.g., the same encryption algorithm). Additional examples and explanation of vertical and horizontal profiling are provided herein.

As may be appreciated from the above description, then, the model repository 104 may contain hundreds or thousands of models, where each model may contain tens, hundreds, or thousands of elements. In the simplified example of FIG. 1, the single UML model 106 is illustrated as including element 1 106a, element 2 106b, and element n 106n. That is, as may be understood from basic principles of UML, the UML model 106 may include these elements 106a, 106b, 106n as being graphically represented and arranged to illustrate a functionality, operation, or other characteristic of an associated software application or other process. More detailed and specific examples of UML model 106 and associated elements are provided herein.

Meanwhile, as described, one or more profile meta-models provided for UML may exist in the profile repository 108. As a result of the operations of the annotation engine 102, as described herein, an annotation 107a and 107b may be applied to the UML model 106 as extensions of the element 106n. For example, the annotation 107a may be an example of a vertical profiling as referenced above (e.g., a specification that a software component associated with the element 106n should be implemented using CORBA), and may be applicable only to the element 106n within the context of the UML model 106 and its associated software application. Meanwhile, the annotation 107b may be an example of the horizontal profiling referenced herein, such as a security annotation specifying an encryption algorithm to be used by the associated software component (here, a CORBA component). Then, although the UML model 106 illustrates the annotations 107a, 107b in dashed line to illustrate their optional addition to the UML model 106 based on actions of the annotation engine 102, it may be appreciated that the inclusion of the annotations 107a, 107b allow the UML model 106 to serve as an example of the annotated UML model 110, as well (which, as described, may be returned to the model repository 104 for use and/or for further annotation thereof).

Many other examples of models, elements, and associated annotation or profiling thereof are described herein. In general, the concepts related to the extension of models/elements through the use of an associated extension or profile meta-model may be known or characterized by a plurality of terms and terminologies. For example, although the extension of the UML model 106 is described herein as using a profile meta-model for profiling the UML model 106 through annotation of one or more elements thereof, it may be appreciated that such model extensions also may be referred to as refining, branding, stereotyping, integrating, or specifying the models/elements, or may be referred to as adding metadata to the models/elements. Such terminology may be overlapping or interchangeable, or may be dependent on the type of modeling language, model, or element being extended/annotated. Further, although the elements 106a, 106b, 106n are referred to as being associated with a software component, it may be appreciated that UML includes other (or more specific) types of elements, e.g., interface elements, activity elements, class elements, operation elements, or statemachine elements.

Thus, in general, in the context of UML models used in the present examples, the concept of profiling the models/elements is known, and is not described further herein, except to provide illustrations and examples of operations of the annotation engine 102. However, although concepts of profiling/annotation are known to some extent in UML, Java, or other contexts, these known concepts, by themselves, may suffer reduced or eliminated utility relative to the example system 100 of FIG. 1. For example, as already referenced, the model repository 104 may contain hundreds or thousands of models, so that, without the annotation engine 102, a designer or other user may need to sort through the many models in order just to find the desired models/elements, and then proceed to add a desired annotation(s) to each element. If a designer fails to determine all desired models, or determines incorrect ones of the desired models/elements, then the resulting annotation will be incorrect and/or incomplete. Moreover, even if the desired annotation is completed accurately, the time required to do so may be impractical. Still further, even if the desired annotations are completely and correctly added, it may later occur that the annotation(s) themselves must be amended or corrected, whereupon the designer may have to re-implement the process of locating desired models/elements for (re) annotation thereof.

The annotation engine 102 allows for querying of the model repository 104 in a manner that returns, as a result set, desired models/elements that the designer or other user wishes to annotate. For example, the annotation engine 102 may include a query interpreter 112 that executes queries against the model repository 104. These queries may include, for example, syntactic queries 114, semantic queries 116, or type-level queries 118. Examples of such queries are provided in detail, below; however, it will be appreciated that the use of these and other queries provide a large degree of flexibility and ease to a designer or other user to select and obtain desired models and/or elements thereof.

The annotation engine 102 further includes a profile reader 120 that may be configured to obtain a desired profile meta-model from the profile repository 108, and a profile integrator 122 that may be configured to receive the profile meta-model from the profile repository 108 for the creation and integration of instances thereof with the result set of models/elements provided by the query interpreter 112. Then, as described herein, the profile integrator 122 may be configured to output the annotated UML model 110 (e.g., back to the model repository 104 and/or for use in an associated software application or other process).

In some implementations, the annotation engine 102 may be configured to compile, interpret, or otherwise process a domain-specific language (DSL) to obtain the properties and functionalities described herein. For example, one or more such DSL(s) may provide for the querying of the model repository 104 by the query interpreter 112, the reading of the profile repository 108 by the profile reader 120, and/or the annotation of the retrieved model/elements with instances of the retrieved profile(s) by the profile integrator 122.

In some example implementations, the annotation engine 102 may process the DSL using a domain specific model (DSM) that is provided to the annotation engine 102, e.g., through a DSM repository 124. Examples/explanations related to DSM(s) are provided below, but in general it may be appreciated from the above description that the DSM(s) may include a query portion and an edit or integration portion, and that interpretation of these portions by the annotation engine 102 results in the annotated UML model 110, as shown in FIG. 1.

In FIG. 1, the annotation engine 102 is illustrated as being executed using a computing device 126, which may represent one or more computing devices having appropriate processing, memory, and other hardware and/or software useful in executing the annotation engine 102. In some example embodiments, the computing device 126 may present a local device running the annotation engine 102 locally, while in other examples, the computing device 126 may represent a server computer that provides the annotation engine 102 as a service to a local (client) device, perhaps over the Internet or other network. Of course, many other configurations and implementations are possible.

A user interface 128 may represent a graphical user interface (GUI) used by a designer or other user to utilize the annotation engine 102, and/or may include a browser, a text editor, or any known technique to, for example, enter query parameters or otherwise specify models or profiles. The user interface 128 may be provided to or accessed by designers or other users, illustrated in FIG. 1 as one or more stakeholder(s) 130.

In this regard, it will be appreciated that such stakeholders represent persons or entities who may have similar or overlapping interest in a use of the annotation engine 102. Examples are provided herein, but in general the stakeholders 130 may include a first stakeholder interested in details of a particular software application modeled by the UML model 106, while another stakeholder may have an interest in security annotations applied to any model that is retrieved from the model repository 106 (whether including the UML model 106 or not). By separating the interests of such stakeholders 130 in using and annotating models from the model repository 104, the annotation engine 102 makes it possible for the different stakeholders to focus on their areas of interest and expertise. Moreover, subsequent annotations to the annotated UML model 110 may be made in a consistent, predictable, straight-forward manner, e.g., when the appropriate stakeholders are responsible for determining their respective annotations.

Although FIG. 1 illustrates a number of example implementations of the annotation engine 102, it will may appreciated that these examples are illustrative, and non-limiting. Additional or alternative examples are provided herein, and still further implementations, not explicitly discussed, also would be apparent to those of skill in the art. For example, as described below with respect to FIGS. 5-8, 11, and 15-17, the DSL of FIG. 1 may be extended using extension points in order to make use of non-domain specific languages (e.g., Java) to perform certain types of annotations of the UML model 106. The usage of the UML models that are handed over to the extension points that may be implemented in a non-domain specific language is not limited to annotation. For instance, the UML models may be transformed further to more concrete models and/or implementations, or may be executed by the extension points directly. More details of extension points, as well as features of other example implementations, are provided herein.

Figure 2:
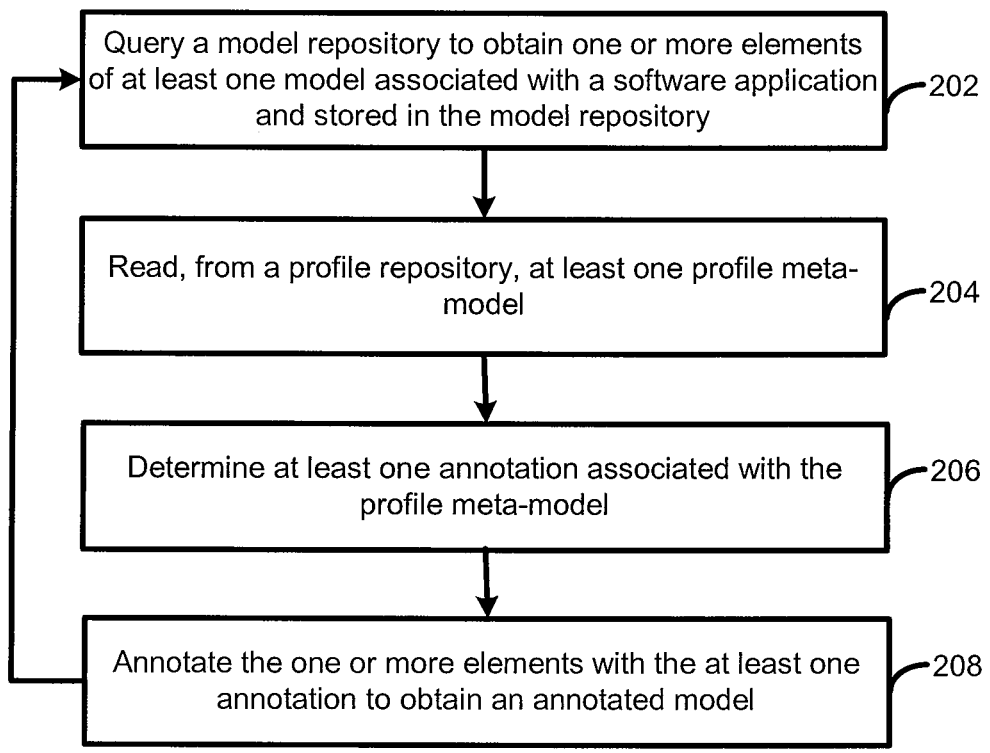
FIG. 2 is a flowchart illustrating example operations of the system of FIG. 1.

FIG. 2 is a flowchart 200 illustrating example operations of the system 100 of FIG. 1. In the example of FIG. 2, a model repository may be queried to obtain one or more elements of at least one model associated with a software application and stored in the model repository (202). For example, the query interpreter 112 may be configured to query the model repository 104 to obtain one or more of the elements 106a, 106b, 106n of the model 106, or of other models.

At least one profile meta-model may be read from a profile repository (204). For example, the profile reader 120 may be configured to read a profile meta-model from the profile repository 108. In some examples, the profile reader 120 may read the desired profile meta-model automatically, e.g., based on a desired characteristic of the annotated UML model 110. In other examples, one of the stakeholders 130 may specify, e.g., by way of the user interface 128, a desired profile model which is an instance of a profile metamodel read from the profile repository 108.

At least one annotation associated with the profile meta-model may be determined (206). For example, the profile reader 120 and/or the profile integrator 122 may be configured to determine a desired annotation, where, again, such a determination may be made automatically or semi-automatically, or in response to a user input.

The one or more elements may be annotated with the at least one annotation (e.g., referred to as stereotypes in the example of UML profiles) to obtain an annotated model (208). For example, the profile integrator 122 may annotate the element 106n with the annotations 107a, 107b to obtain the annotated UML model 110, as shown in FIG. 1.

Thus, as referenced above, annotations may be used to add meta-data to first class elements of, e.g., UML models. In this context, the definition of the term elements may depend, for example, on a current engineering stage and the language(s) used in that stage. For example, in the design stage, and if UML is applied as in FIG. 2, then elements may be defined relative to the Meta-Object Facility (MOF) which is a domain specific language (DSL) for defining metamodels. MOF may be considered as being constructed of a plurality of layers, known as the M3 layer (a meta-meta model at a highest layer, for constructing metamodels), the M2 layer (meta-models built using the M3 layer; an example of the M2 layer is the UML metamodel that defines UML models), and the M1 layer (such as UML models). Finally, the M0 layer, also known as the data layer, may be used for real-world phenomena. A specific example of MOF is known as ECore, part of the Eclipse Modeling Framework, which provides a subset of the functionality defined for MOF.

In this context, then, the term element may be defined as any element defined in UML at MOF-M2 which can be annotated in MOF-M1. Example UML model elements that may be annotated at MOF-M1, as referenced above, are Component, Interface, Activity, Class, Operation, or Statemachine. In the programming phase, for example, languages such as Java may allow annotation to elements such as Class, Interface, Operation, or Parameter.

Consequently, the system 100 of FIG. 1 may be implemented in various contexts and stages, e.g., the design stage or the implementation stage. In the implementation stage, for example, Java, the system 100 may be implemented using an Aspect Oriented Programming (AOP) language, such as AspectJ. In the design stage, for example, UML, then as referenced herein a domain specific language, or DSL (a specific example(s) of which is provided below) may be used that allows for the querying, editing, and annotating of selected/desired UML models.

Figure 3:
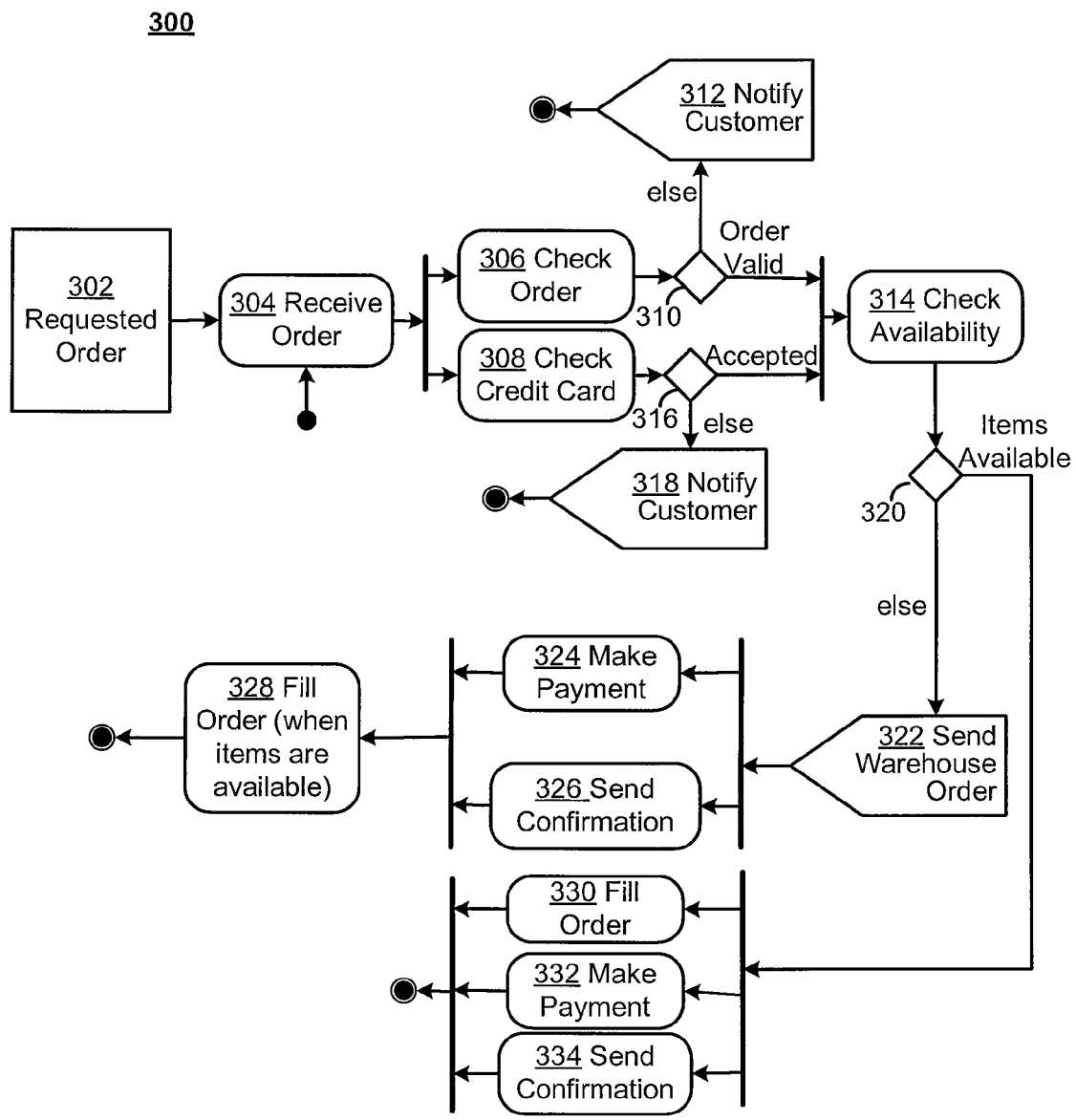
FIG. 3 is a block diagram of an example model used in the system of FIG. 1.

FIG. 3 is a block diagram of an example model 300 used in the system 100 of FIG. 1, and referenced below to provide example operations as described above with respect to FIGS. 1 and 2. The example of FIG. 3 relates to a sales order processing scenario.

In FIG. 3, a Requested Order 302 represents an input parameter node for an action or activity Receive Order 304. Upon receipt, the order details may be verified at action Check Order 306, while credit card data are checked at action Check Credit Card 308. If the order is not valid (310), then the customer may be notified at action 312. Similarly, if the credit card is not accepted, then the customer may be notified at action 318. However, if the order is accepted and the credit card verified, then the order may proceed by checking availability of the item(s) at an action Check Availability 314.

In case of limited or no availability (320), then an order and/or many orders may need to be created internally on the items that are not in stock. This is achieved in a Send Warehouse Order action 322, which, once completed, leads to an action of Make Payment 324 (e.g., charging the credit card) and a Send Confirmation (e.g., sending an invoice/receipt) action 326. When both of these are concurrently completed, then a Fill Order (e.g., shipping the item(s)) action 328 may complete. Similarly, if the item(s) is available immediately, then concurrent actions Fill Order 330, Make Payment 332, and Send Confirmation 334 may proceed immediately.

As referenced above, examples of horizontal profiles or annotations may include such extensions in the domains of performance and security. With respect to performance (e.g., response times or reliability quality measures), it may be appreciated that performance is relevant at each software engineering phase. For example, in the analysis and design stage, performance profiles may be used to annotate the analysis and/or design models with performance attributes. The purpose of the attributes may differ. For instance, a performance attribute may be a requirement or an actual statistical value that shows the performance, e.g. the response time, of the annotated model element, e.g., of a service operation. A UML profile meta-model (such as might be stored in the profile repository 108 of FIG. 1) for performance is proposed by the Object Management Group (OMG7).

For example, it may occur that the Check Order action 306 and the Check Credit Card action 308 may be annotated to specify their performance using web services (e.g., the annotation 107a may be attached to the Check Order action 306 as a web service annotation, and similarly for the Check Credit Card action 308). Such an annotation, as described in detail herein, represents a vertical annotation in which the referenced actions are specified more completely within their domain from a technological perspective. Further, specific hosts where the entity providing the relevant service/functionality may be included in the annotation(s), and this information, among other information, may be used to determine performance metrics for these or other nodes of the UML diagram.

Then, and according to the UML performance profile meta-model referenced above, edges of the UML diagram (such as the UML diagram of FIG. 3) may be annotated to provide a probability of execution of the annotated edge. For example, at the decision point 310, the "Order valid" edge may be annotated with a 0.7 and the "else" edge may be annotated with a 0.3, to represent the edges' respective probabilities of occurring. Similarly, the "Accepted" edge of the decision point 316 (representing a credit card acceptance) may be annotated with a probability of 0.8, while the "else" edge from the decision point 316 may be assigned a 0.2 probability.

In the area of security, UML profiles for annotating UML models with different types of security meta-data are similarly known. As referenced herein, such security meta-data may include details regarding encryption, authentication, or authorization.

As referenced above, it is possible to manually annotate each desired element (e.g., node or edge) of the UML diagram 300 of FIG. 3. However, when the diagram 300 is one of a large number of models within the model repository 104, or when the diagram 300 represents a much larger model having hundreds or thousands of elements, then such manual annotation becomes problematic and impractical. Even if implemented, such manual annotations may be difficult to change at a later date when updates become necessary.

In contrast, the system 100 of FIG. 1 allows for the model (or elements thereof) of FIG. 3 to be queried and annotated declaratively, programmatically, and automatically, so that even large models or model repositories may be easily extended and annotated. Further, as described herein, each such annotation may be accomplished in its own space, meaning, for example, that vertical annotations (such as specifying the Check Order action 306 as a web service) may be performed separately from horizontal annotations (such as performance annotations). Consequently, it may be straight-forward to perform later updates to any one of these annotations, i.e., without concern about affecting any of the other annotations (for example, updating the performance profile without concern over affecting the web service annotation).

With respect to FIG. 1, the query interpreter 112 of the annotation engine 102 may include, for example, and as described, syntactic queries 114, semantic queries 116, and type-level queries 118. The various types of queries may be understood in the context of the example of FIG. 3.

For example, regarding syntactic queries 114, it may be appreciated that, in general, such syntactic queries allow users such as stakeholders 130 to execute queries over specific words or phrases used to name models/elements. For example, syntactic queries may be used to filter elements based on string values provided in the DSM (e.g., the DSM selected from the DSM repository 124). For instance, a syntactic query may be defined as: "SelectActivity from SalesOrderProcessingModel where Node.name=CheckOrder." In this case, from the model 300, the Check Order action 306 may be returned as a result set of this syntactic query.

More generally, it may be required to fetch all actions that have the more general purpose of checking on some other action or parameter. In FIG. 3, these are the actions Check Order 306, Check Credit Card 308, and CheckAvailabiity 314. With the syntactical query part of the language, this can be achieved using "Select Activity from SalesOrderProcessingModel where Node.name like Check*". With this query, any action is selected from the model 300 that is named with or whose name begins with "Check".

Semantic queries 116 allow for selection of UML elements based on their semantics instead of, for instance, their names. With semantic queries, the query may remain stable independent of the size of the models, as compared with syntactic queries which may be affected by, e.g., syntactical changes of names of the referred model elements.

Use of semantic queries may be facilitated by annotation of the referenced model elements using appropriate meta-data. For instance, each of the three "Check" actions 306, 308, 314 in FIG. 3 may be annotated with the stereotype "Check". Then, the results of the above queries may be obtained using the semantic query of "Select Activity From SalesOrderProcessingModel, Where Node.appliedStereotype=MyProfile:: Check." In this example, MyProfile refers to a logical reference to a profile in which the stereotype Check is defined (at MOF-M2 level).

Regarding type-level queries 118, such queries provide for selection of all elements from a model that are of a certain type. For example, a query may be executed to select all actions from FIG. 3 that are executable, or have some other specific/identifiable type. In the example of FIG. 3, all actions are executable, as opposed to the fork/Boolean/decision points that are not executable. Then, a type-level query may be formulated as "Select Activity From SalesOrderProcessingModel, Where type=ExecutableNode". The concept of ExecutableNode may be mapped internally to executable nodes in the example of UML. Such queries may be particularly useful for stakeholders 130 who are non-UML experts.

Using one or more of (each of) the above-referenced queries, a stepwise refinement technique may be used to successively apply profile data to models, e.g., to the model 300 of FIG. 3. Such stepwise refinement may be used, for example, if there is a dependency between the profiles that are applied. For instance, it may occur that all of the actions 306, 308, 314 whose name begins with Check as well as the action MakePayment 332, 324 are to be annotated as Web services. Additionally, each Web service may be implemented as an Enterprise Java Bean (EJB). As described herein, this is an example of a vertical refinement. Further, QOS profile information as performance and/or security stereotypes can be applied to Web service and/or EJBs.

In this example, a syntactic query may be defined for selecting the four actions that must be Web services. Afterwards these may be annotated with the corresponding stereotype for branding these as Web services. Afterwards, a semantic query may be used that selects the Web services of the activity and then apply an EJB-profile on it. Afterwards, all EJBs may be selected to apply security and/or performance stereotypes accordingly.

In other implementations, all of the referenced profiles may be applied using a single query. However, if each distinct profile is applied in its own space then different types of stakeholders 130 (e.g., Web service and EJB-designers, as well as performance and security engineers) can focus on the subset of the model(s) as well as profiles that are relevant from their respective perspectives. Then, each of these stakeholders may be interested in applying distinct profile information onto (the same) models. Each stakeholder 130 would use its own DSM from the DSM repository 124, and could therefore easily monitor and maintain their own relevant aspects of the model 300.

Figure 4:
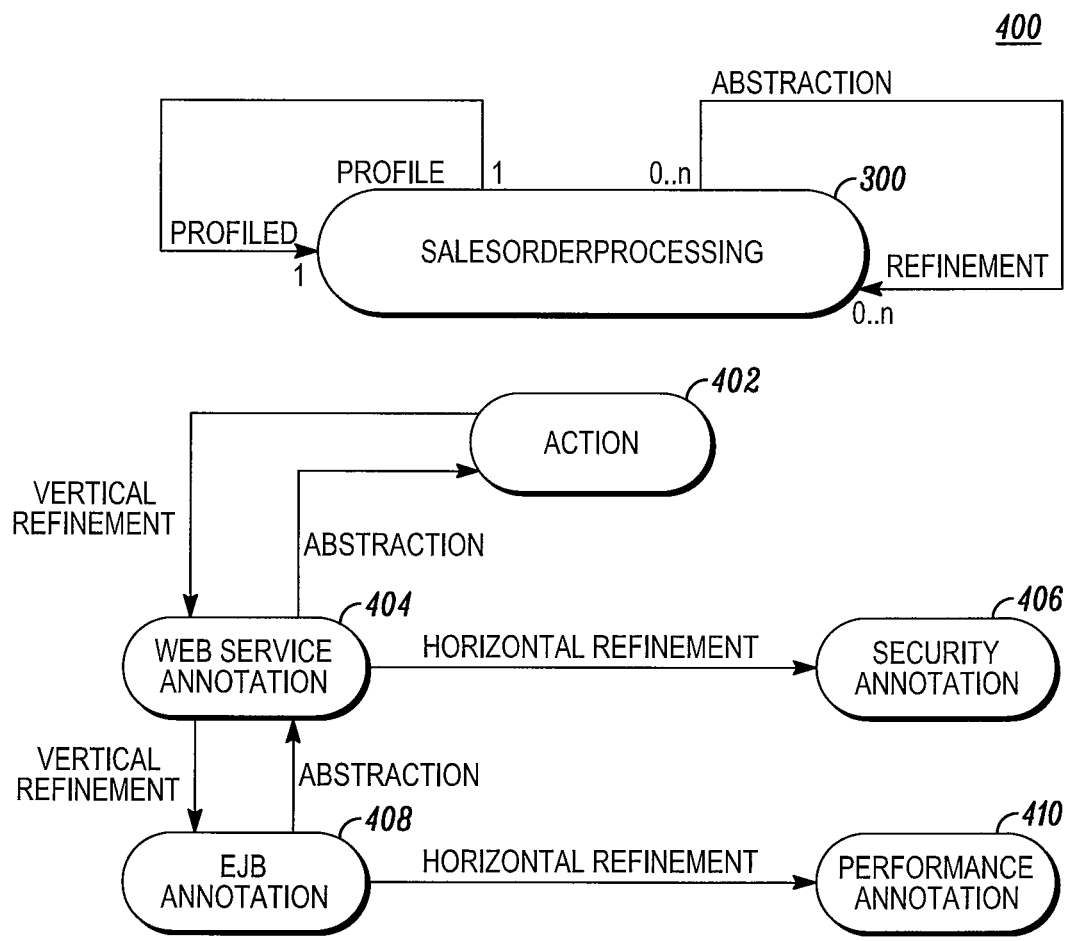
FIG. 4 is a block diagram illustrating stepwise refinement of the model of FIG. 3.

FIG. 4 is a block diagram 400 illustrating stepwise refinement of the model 300 of FIG. 3, using vertical and horizontal refinements (annotations). As described above, modeling allows for representation of layers of relatively more abstract concepts and relatively more concrete concepts. For example, concepts such as process components and services are more abstract than specific implementation of such components/services. For example, a Web service is a more concrete concept than is a service. Meanwhile, otherwise different concepts may exist at the same abstraction layer (e.g., CORBA components instead of stateless session beans).

In the described approach, there is a relationship between the refinement/abstraction relationship and the profile/profile application relationship. For example, for vertical refinements, UML profiles are used to annotate the models with corresponding concepts, such as service and, possibly, web service(s). Specifically, a first (higher-level) profile may exist for the concept service, while a second, more concrete profile may exist for web service(s).

FIG. 4 illustrates an example of these concepts for the Sales Order Processing model 300 of FIG. 3. Specifically, as shown, an action 402 (which may represent virtually any action of FIG. 3) may be subject to a vertical refinement for annotation as a web service 404. A horizontal refinement may result in a particular security annotation 406 being associated with the action 402. Meanwhile, a second vertical annotation may result in associating the web service with implementation as an EJB 408. Finally, a performance annotation 410 may represent another horizontal refinement to the action 402.

Figure 5:
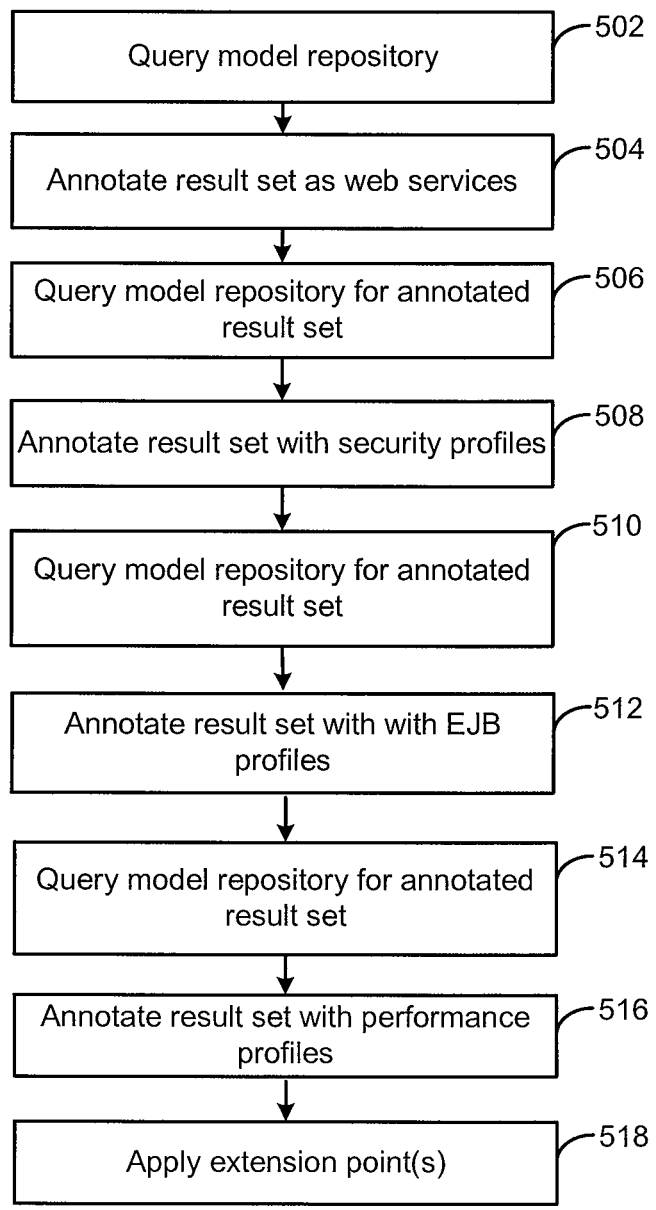
FIG. 5 is a flowchart illustrating example operations of the system of FIG. 1, in the context of FIG. 4.

FIG. 5 is a flowchart 500 illustrating example operations for the block diagram of FIG. 4, using the various queries and annotations described above with respect to FIGS. 1-4. In the example of FIG. 5, the model repository 104 may be queried (502), and the result set annotated as web services (504). For example, it may occur that the actions of FIG. 3 whose name commences with Check as well as MakePayment are to be refined and provided as Web services. This constitutes a vertical refinement in that more technology-specific information is added to the model 300. The corresponding query and profile application is depicted in the code section 1:

Code Section 1

```
webServicesNodes := Select Activity From SalesOrderProcessingModel
Where Node.name like Check* or Node.name = MakePayment;
webServicesNodes.adapt
{
    WebServiceProfile
    {
        WebService
        {
            generateWSDL := true;
        }
    }
}
```

In Code Section 1, in the first two lines the query is defined. The attribute named webServicesNodes contains the result set. An instance of a profile meta-model with the logical reference name WebServiceProfile and its corresponding stereotype WebService are then created and applied to each element of the result set automatically, which may then be returned to the model repository 104.

The model repository 104 may be queried for this annotated result set (506), and the subsequent result set may be annotated with security profiles (508). As described, this constitutes a horizontal refinement in that it may be applied not just to the annotated result set from the model 300, but may be applied across a number of domains/models at the same time, and independently of previous or subsequent vertical refinements. However, for the sake of simplicity, the present example is restricted just to the model 300 of FIG. 3.

In this example, data to be exchanged with the Web service(s) should be kept confidential. To add a corresponding security annotation constitutes a horizontal refinement of the Web services and is presented with Code Section 2:

Code Section 2

```
SecureWebServices := Select Activity From SalesOrderProcessingModel
Where Node.appliedStereotype = WebServiceProfile::WebService;
SecureWebServices.adapt
{
    SecurityProfile \\
    {
        Confidentiality
        {
            crytographicSystem := "SymmetricCryptography";
            algorithm := "AES";
            keyLength := 64;
        }
    }
}
```

In the example of Code Section 2, all Web services are initially annotated with some data as a default annotation, e.g., a security profile that is referenced with the logical name SecurityProfile may be applied to all Web services. The stereotype Confidentiality is applied as an example.

Annotation with security profiles may continue if, for example, the data exchanged with the Web service named MakePayment (i.e., 324, 332) must be additionally kept more confidential, e.g. by using a key of larger size than 64, such as 256. There exist at least two different ways to select this Web service, e.g., either purely syntactically or a combination of syntactic and semantic query.

For example, the latter approach may be used if there exist various actions that are named MakePayment but just one that is a Web service. In this case, the query may be illustrated as Code Section 3:

Code Section 3

```
MakePaymentWebService := Select Activity From
Where Node.appliedStereotype = WebServiceProfile::WebService
    and Node.name = MakePayment;
MakePaymentWebService.adapt
{
    SecurityProfile
    {
        Confidentiality
        {
            keyLength := 256;
        }
    }
}
```

Once security profiles have been added (and the resulting annotated model(s) added back to the model repository 104), annotation may continue with querying the model repository 104 for the previously-annotated result set (510), for annotation thereof with EJB profiles (512). That is, in this example, EJB may be selected as an implementation strategy for the previously-designated Web services, as may be appreciated from FIG. 4. Consequently, the corresponding EJB profile may be applied to the model 300 of FIG. 3 in a further refinement step, which, again with reference to FIG. 4, may be understood to constitute a vertical refinement. The EJB profile(s) may be added using Code Section 4:

Code Section 4

```
EJBs := Select Activity From SalesOrderProcessingModel
Where Node.appliedStereotype = WebServiceProfile::WebService;
EJBs.adapt
{
    EJBProfile
    {
        SessionBean
        {
            stateless := true;
        }
    }
}
```

Thus, in Code Section 4, a semantic query is applied. An EJB profile that is referenced with the logical name EJBProfile is applied to each element of the result set referenced by the variable EJBs. Corresponding session bean data may be applied as well. The resulting annotated model may be returned to the model repository 104.

Further in FIG. 5, the model repository 104 may again be queried (514) and the result set of the query may be annotated with performance profile(s) (516). In the example(s) of FIG. 5, all EJBs are to be deployed onto the same host, where the host information here is considered to be a performance concern. The profile application may be performed using Code Section 5:

Code Section 5

```
EJBs := Select Activity From SalesOrderProcessingModel
Where Node.appliedStereotype = EJBProfile::SessionBean;
EJBs.adapt
{
    PerformanceProfile
    {
```

-continued

```
Code Section 5

Deployment
{
    host := Select Host From
SalesOrderDeployment
        Where Host.name =
        NetweaverExecutionEnvironment;
    }
}
```

In the example of Code Section 5, the performance profile that is referred to with the logical name PerformanceProfile and its single stereotype Deployment are applied to the EJBs. The host is defined, i.e., a host NetweaverExecutionEnvironment is fetched with the query from a model that is referenced with the logical name SalesOrderDeployment.

Finally in FIG. 5, extension points(s) may be applied to the annotated model (518). The concept of an extension point in this context refers to scenarios which may require logic in the DSM that is imperative and/or relatively complex. In such cases, extension point(s) may be used to extend the domain specific language (DSL) executed by the annotation engine 102. Extension points hinder or prevent the ad-hoc (and thus difficult to manage) implementation of new language constructs. Consequently, the concept of extension points may keep the DSL stable and may allow for extensions in non-domain specific languages, such as Java. As a consequence, virtually anything that is possible in Java such as graphical representation, persistence, simulation and execution as well as the monitoring of the annotated (process) models can be defined as extension points to the DSL, without affecting the existing DSL. Although FIG. 5 conceptually illustrates the use of extension points as a final operation in the example, it may be appreciated that FIG. 5 is merely an example, and that the described extension points herein, or other extension points, may be applied earlier in the process(es), and/or concurrently with other annotations, as needed.

Figure 6A:
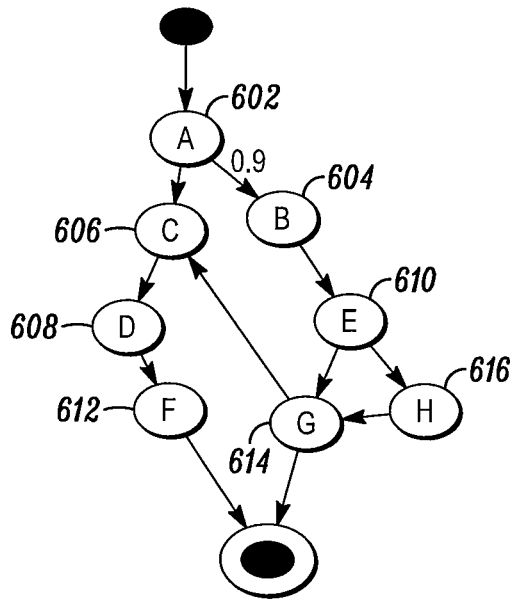
FIGS. 6A and 6B illustrate an example of an extension point(s) for the domain specific language (DSL) of FIG. 1.
Figure 6B:
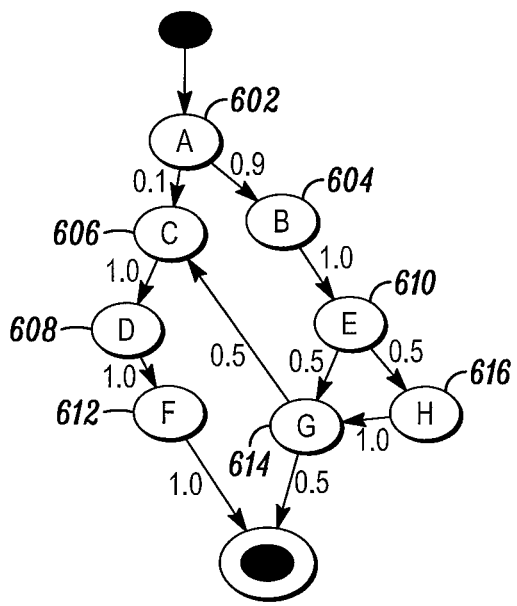

FIGS. 6A and 6B illustrate an example of an extension point(s) for the domain specific language (DSL) of FIG. 1. Specifically, FIGS. 6A and 6B illustrate an extension point referred to as a key path extension, in which any path of one or more UML activities that has/have not been previously annotated with a performance profile(s) are annotated automatically. For example, performance stakeholders, among others, may be interested in key paths to simulate the response time of different (key) paths through the UML model, e.g., the UML model 300. Then, a simulation can be achieved by, e.g., interpreting the UML activity annotated with profile data describing the probability of execution of a path.

Thus, it may occur that a model may have edges annotated with performance data (e.g., such as the examples above in which a probability of execution of one or more activities is expressed at the decision points 310, 316 of FIG. 3). Then, the purposes of this example extension point may be to fill the remaining paths with probability information automatically.

In the generic/abstract example of FIGS. 6A and 6B, KeyPathExtension includes of an equally-named single class that automatically implements an algorithm for edges of an activity/model. The input model, which represents an abstract activity annotated with the key path by a user, is depicted in FIG. 6A as model 600a, in which activities 602-616 are illustrated as actions "A" through "H," respectively. In FIG. 6A, the probability of the edge between activities 602 and 604 being executed is identified as being 0.9.

More specifically, after a start node, the node A 602 is executed. The path from A to B (which may be referenced notationally as A::B), is annotated with the probability (90 percent) that this path will be executed at runtime. The remaining edges are not annotated with any probability data in this example. As described, the purpose of the key path extension point of this example is to take this input model 600a, calculate the probabilities of the remaining nodes of the model, and to automatically annotate the edges accordingly.

An example algorithm may be executed as follows. Specifically, beginning with any node of the model 600a, the algorithm first visits its outgoing edges, then each incoming edge(s) of the current node. The algorithm may be constructed to assure that each node and each edge of an activity is visited only once. Visited nodes may be marked accordingly.

A probability of the remaining edges may then be calculated with an algorithm presented in the equation $(1.0-n)/m$, where n is the sum of each annotated value of all outgoing (incoming) edges of the current node. The sum of the outgoing (incoming) edges of a node must be 1. For instance, for A::B n is 0.9 whereas for the remaining examples it is 0. The value m is equal to the size of the outgoing (incoming) edges minus the edges that are annotated already. Hence, the value of m for the outgoing edges of node A 602 is 1 whereas it is 2 for node G 614 as an instance. FIG. 6B illustrates the resulting annotated model 600b, with all edges annotated appropriately and automatically according to the algorithm.

Figure 7:
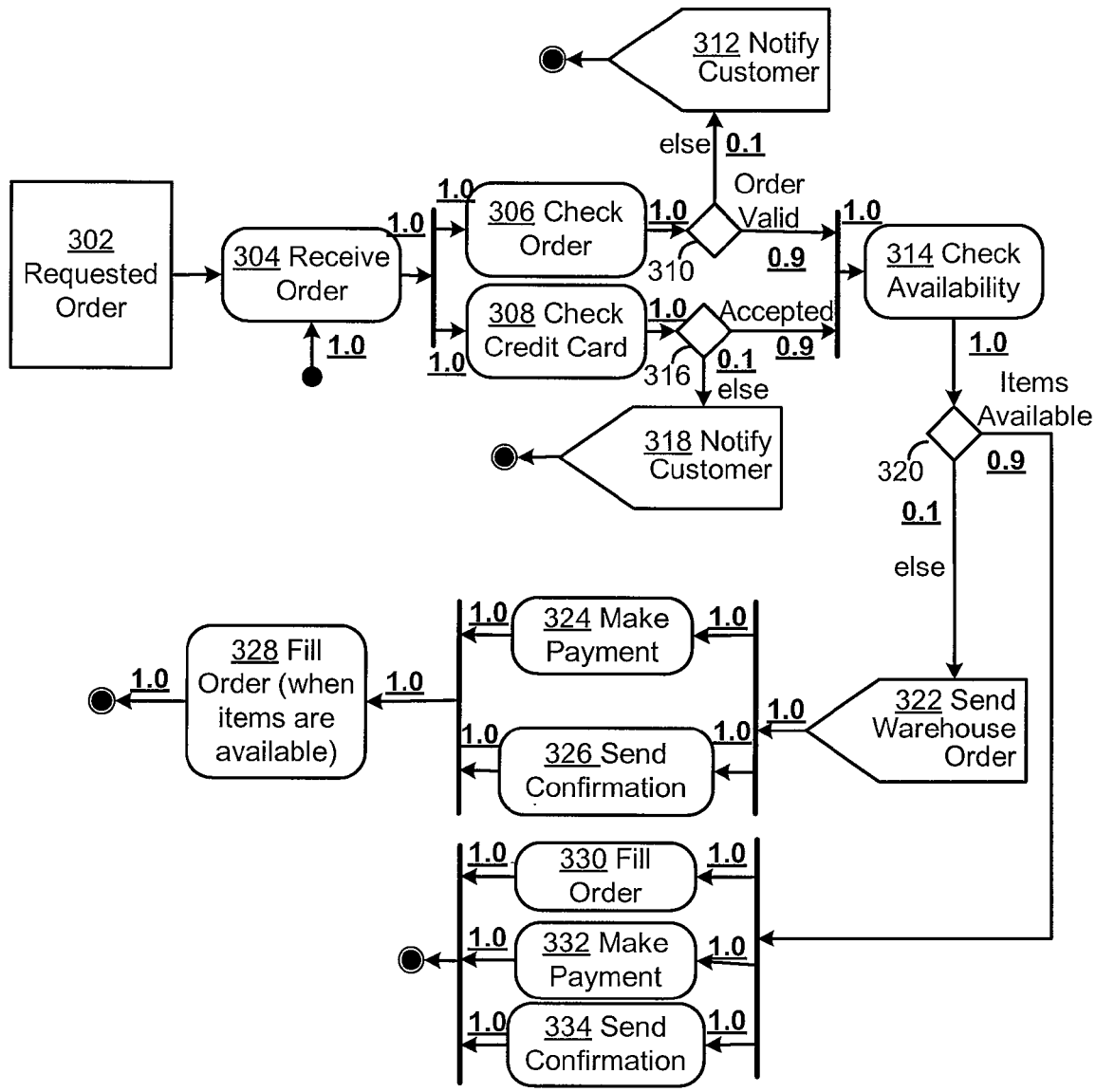
FIG. 7 is a block diagram of the model of FIG. 3, with edges annotated according to the key path extension point of FIGS. 6A, 6B.

FIG. 7 is a block diagram of the model 300 of FIG. 3, with edges annotated according to the key path extension point of FIGS. 6A, 6B. In the example of FIG. 7, a stakeholder 130 (e.g., a performance stakeholder) may be interested in annotating the key path(s) as well as the remaining paths of the sample order processing activity model 300 of FIG. 3.

In FIG. 7, and as referenced above, the edges "Order valid" and "Accepted" leaving decision points 310 and 316, respectively, may be annotated by the stakeholder 130 or other user using the annotation engine 102 of FIG. 1, e.g., with each edge having a 0.9 percent chance of occurring. Hence, as there are only edges outgoing from the connected decision node 310 that is the input of the edge OrderValid, the probability that the orders are invalid and, as a consequence, user customers must be notified, is 0.1, as shown. This value is implicit and may be calculated automatically, as referenced herein.

Annotation of the three edges (i.e., the three edges entering/leaving the decision point 310, 316, and 320), may be achieved as shown in Code Section 6:

```
Code Section 6 keyPaths := Select Activity
From SalesOrderProcessingModel
Where Edge.name = orderValid
    or Edge.name = CCDAccepted
    or Edge.name = itemsAvailable;
keyPaths.adapt
{
    PerformanceProfile
    {
        ExecutionProbability
        {
            Probability := 0.9;
        }
    }
}
```

As seen from Code Section 6, for the key path algorithm, the desired edges are selected from the SalesOrderProcessingModel 300, and the execution probability for each selected edge is applied as part of a performance profile for the model 300. An extension point may be called to automatically calculate and add execution probabilities for all remaining edges, as described above for FIGS. 6A, 6B, and the results of which are shown in FIG. 7. The resulting model may be used, as referenced herein, in further steps such as in simulating the model or annotating it with more detailed performance data.

FIGS. 8-17 illustrate specific examples of how a Domain Specific Language (DSL) can be used to specify Domain Specific Models (e.g., of the DSM model repository 124) which can be (in these examples) interpreted by the annotation engine 102 of FIG. 1 to execute the described features and functions, among others.

Figure 8:
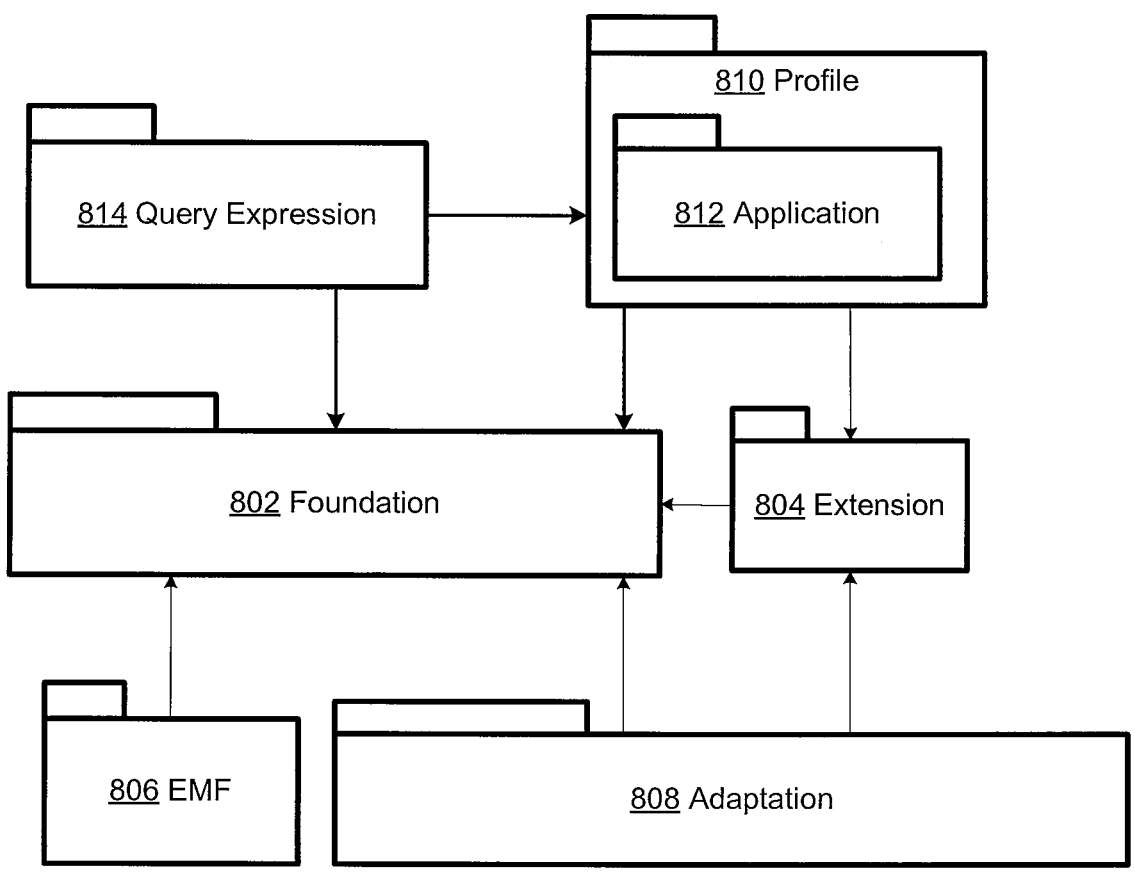
FIG. 8 is a block diagram of language packages of an example DSL for implementing the system of FIG. 1.

FIG. 8 is a block diagram 800 of language packages of an example DSL for implementing the system 100 of FIG. 1. In the example of FIG. 8, the language (DSL) is structured into packages 802-814. In FIG. 8, lines represent dependencies of type usage among the packages 802-814, as shown.

In FIG. 8, and as described in more detail below, the foundation package 802 includes foundational metaclasses such as VarDefinition and Expression. A purpose of the foundation package 802 is to include the specification of basic metaclasses that are reusable through inheritance in the other packages of the language (DSL). The second package is the extension package 804, which extends some meta-classes of the foundation package 802 with the capability of being extensible, e.g., to execute extensions as described herein, including the keypath extension points just described with reference to FIGS. 5-7. Another language extension to the foundation package 802 is the Eclipse Modeling Framework (EMF) package 806, where, for example, as described in the examples below, the DSL may be implemented as an Eclipse plug-in within the EMF.

The extension facility is reused in the adaptation package 808, which includes abstract concepts of an edit process. For instance, the adaptation package 808 may be used to define the meta-classes Adaptable and Adaptation. Those concepts may be composed, for example, with the extension point mechanism provided with the extension package 804, e.g., so as to be able to call extension functions out of a DSM program at certain well-defined places while adapting UML model elements. The package profile 810 and sub-package application 812 represent a concrete adaptation (i.e., annotation) of model elements.

The Query Expression package 814 may contain concepts similar to queries as in the Structured Query Language (SQL), as one example. For instance, the meta-classes Select, From and Where may be defined here. Additionally, the concepts of Boolean expressions and comparators may be specified in the Query Expression package 814. The Query Expression package 814 also may provide the capability of formulating semantic queries, e.g., with query conditions referring to profile data. Consequently, as shown, the Query Expression package contains a dependency to the profile package 810.

Figure 9:
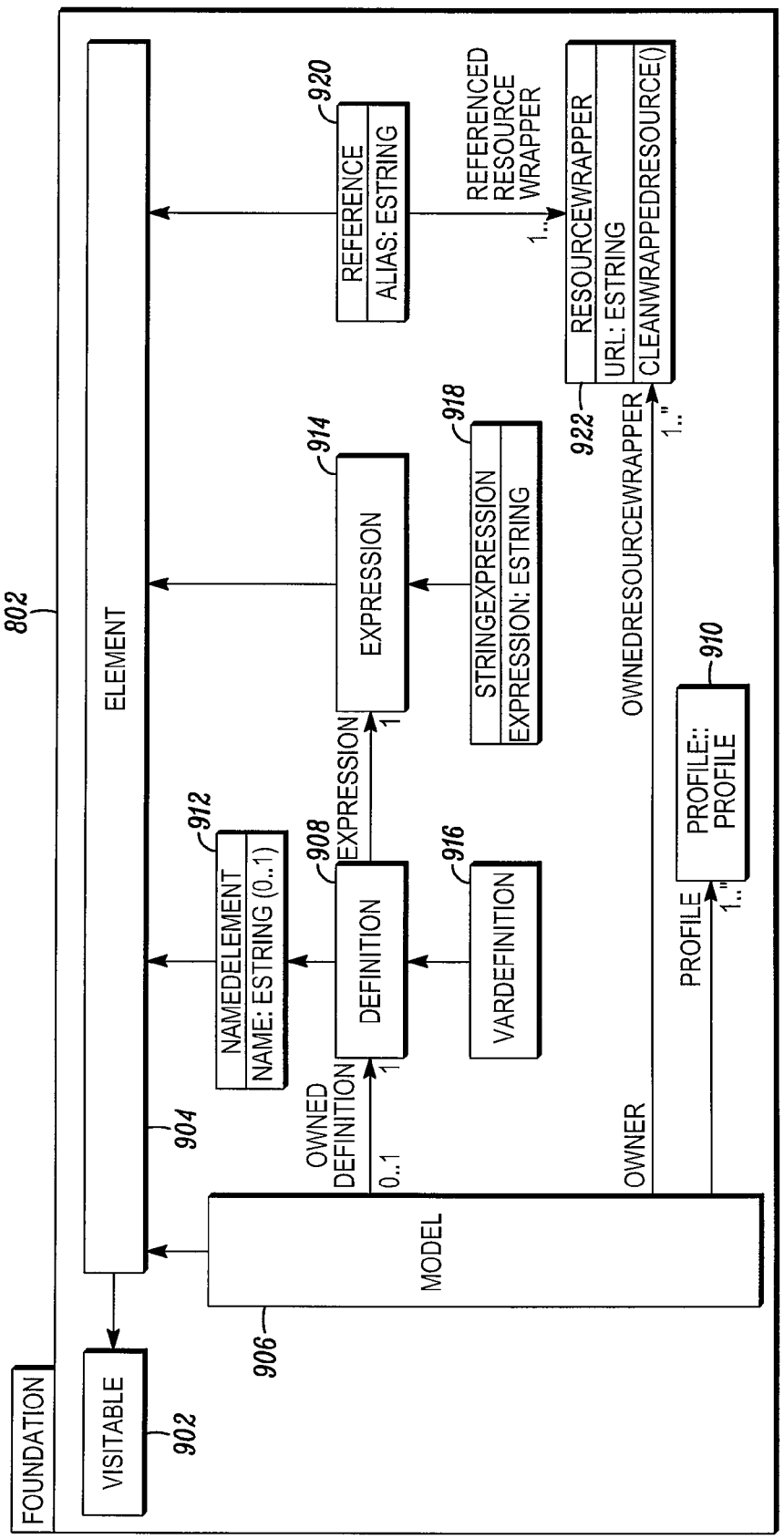
FIG. 9 is a block diagram of the foundation package of FIG. 8.

FIG. 9 is a block diagram of the foundation package 802 of FIG. 8. In the example of FIG. 9, the foundation package 802 include root meta classes Visitable 902 and Element 904, respectively. That is, each element is visitable, where the capability of being visitable can be used in different contexts. For instance, elements of the language can be visited during the interpretation and/or compilation of the DSM.

Hence, Model 906 represents the root of a corresponding Abstract Syntax Tree (AST), which represents a notation-independent model of the DSL 800. The model 906 contains all other elements, either directly or indirectly. For instance, the model 906 may contain one to many definitions as well as one to many profile applications, as represented by the containment relationships to Definition 908 and profile:Profile 910, respectively. Specifically, a Definition 908 is a NamedElement 912 that is initialised with an Expression 914. The type of a definition may be computed implicitly with the DSL. Hence, the types of the concrete definitions do not have to be declared explicitly by the user of the DSL.

In FIG. 9, VarDefinition 916 is also an abstract concept. It is a Definition 908 that is refined in other packages as in the adaptation package 808 and the profile package 810. One concrete Expression 914 that may be implemented is StringExpression 918. Another one is the meta class query::QueryExpression (described below). A reference 920 is also an abstract meta class that contains an alias that is a logical name of the reference. It may be mapped to a concrete physical map in a configuration view 128. References may be used to refer to resources where the used models can be fetched. A ResourceWrapper 922 may be used to wrap platform-specific resources such as Eclipse file resources or relational databases.

Figure 10:
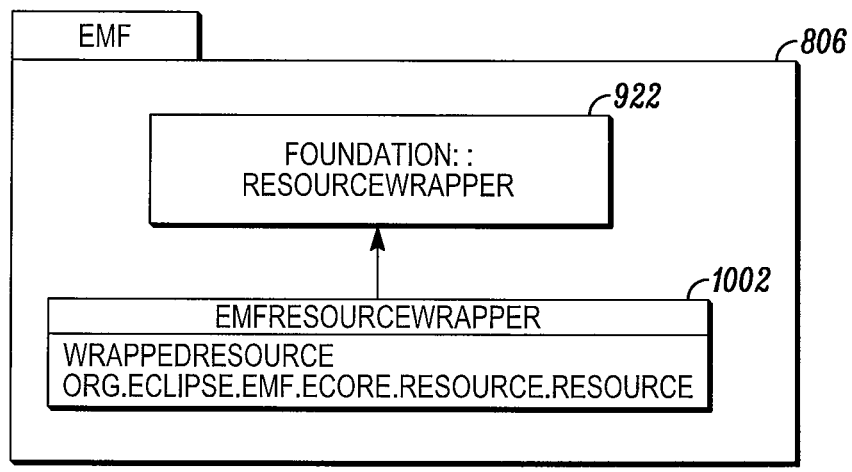
FIG. 10 is a block diagram of the EMF package of FIG. 8.

FIG. 10 is a block diagram of the EMF package 806 of FIG. 8. In FIG. 10, it may be seen that a meta class EMFResourceWrapper 1002 is an example of the foundation::ResourceWrapper 922 of FIG. 9. Consequently, it can be referenced from instances of foundation::Reference 922, and, in this example, wraps a resource interface of a EMF library (e.g., org.eclipse.emf.ecore.resource.Resource). Hence, other types of resources (e.g., relational databases) may be included as model resources for the Resource Wrapper 922 without affecting the DSL.

Figure 11:
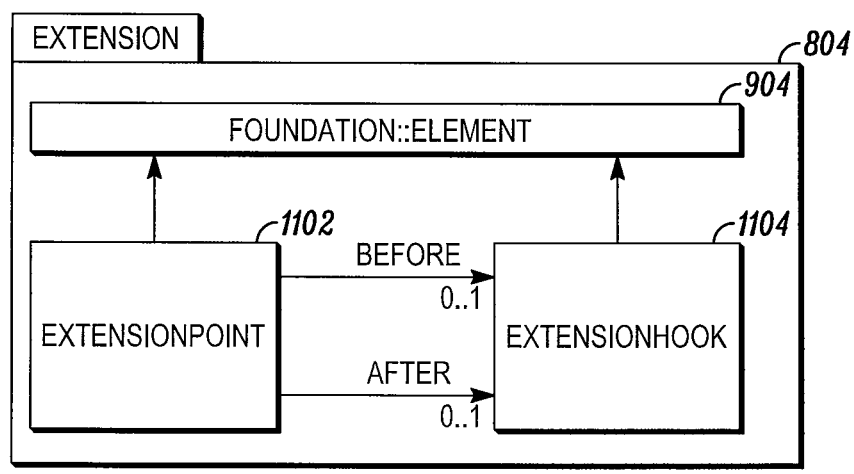
FIG. 11 is a block diagram of the extension package of FIG. 8.

The package extension 804 is illustrated in FIG. 11. In the example of FIG. 11, ExtensionPoint 1102 is an abstract concept that may include extension hooks of the meta class ExtensionHook 1104. A hook may be defined before the extension point 1102 as well as after it, as shown in FIG. 11 with ExtensionPoint::before and ExtensionPoint::after. Other language packages may define the concept of an extension point for the corresponding model element that is a sub-type of ExtensionPoint, where this may be done in the adaptation package 808.

Figure 12:
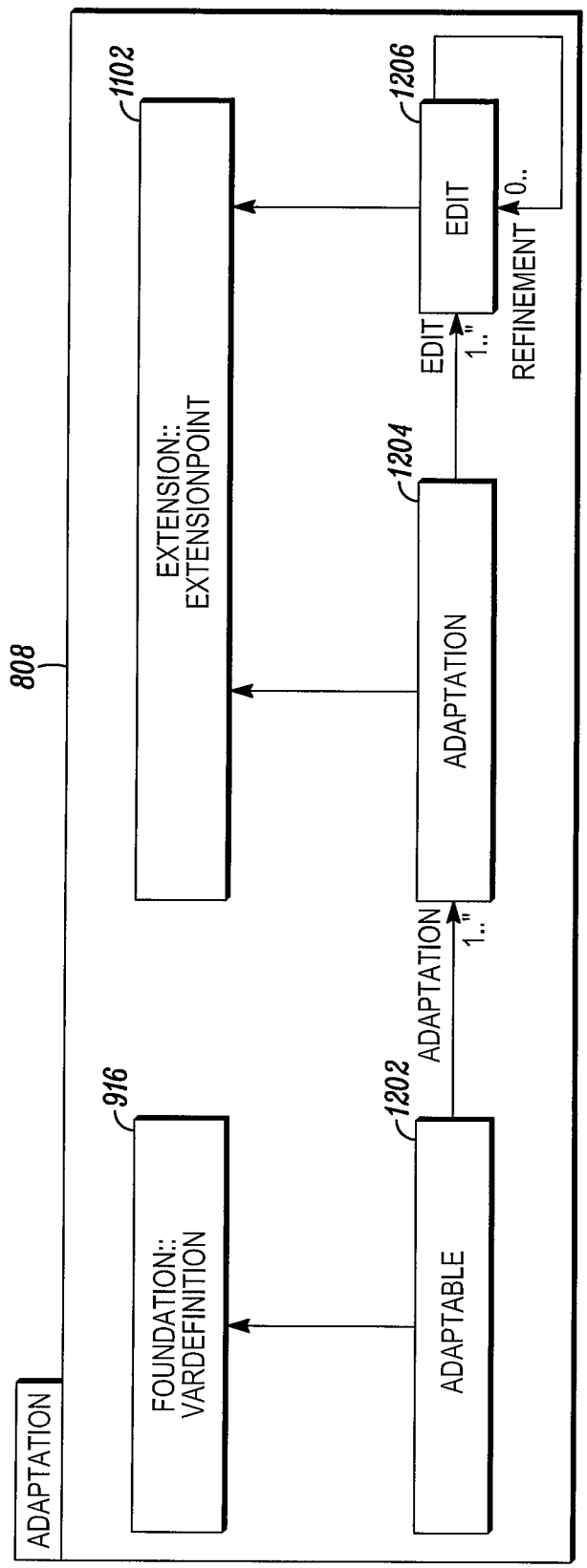
FIG. 12 is a block diagram of the adaptation package of FIG. 8.

Specifically, in the adaptation package 808 as shown in FIG. 12, the concept of an Adaptable package 1202 may be used that is a Varibal Definition 916. As such, it may be used to model variable definitions. Adaptation 1204 may be used for adapting; e.g., each Adaptable 1202 may contain one to many Adaptations 1204, where an adaptation may contain one to many Edits 1206. An Edit 1206 may be refined systematically with several other edits (as represented by the association end name Edit::refinement). Adaptation 1204 as well as Edit 1206 may represent abstract concepts of editing and refinement.

Figure 13:
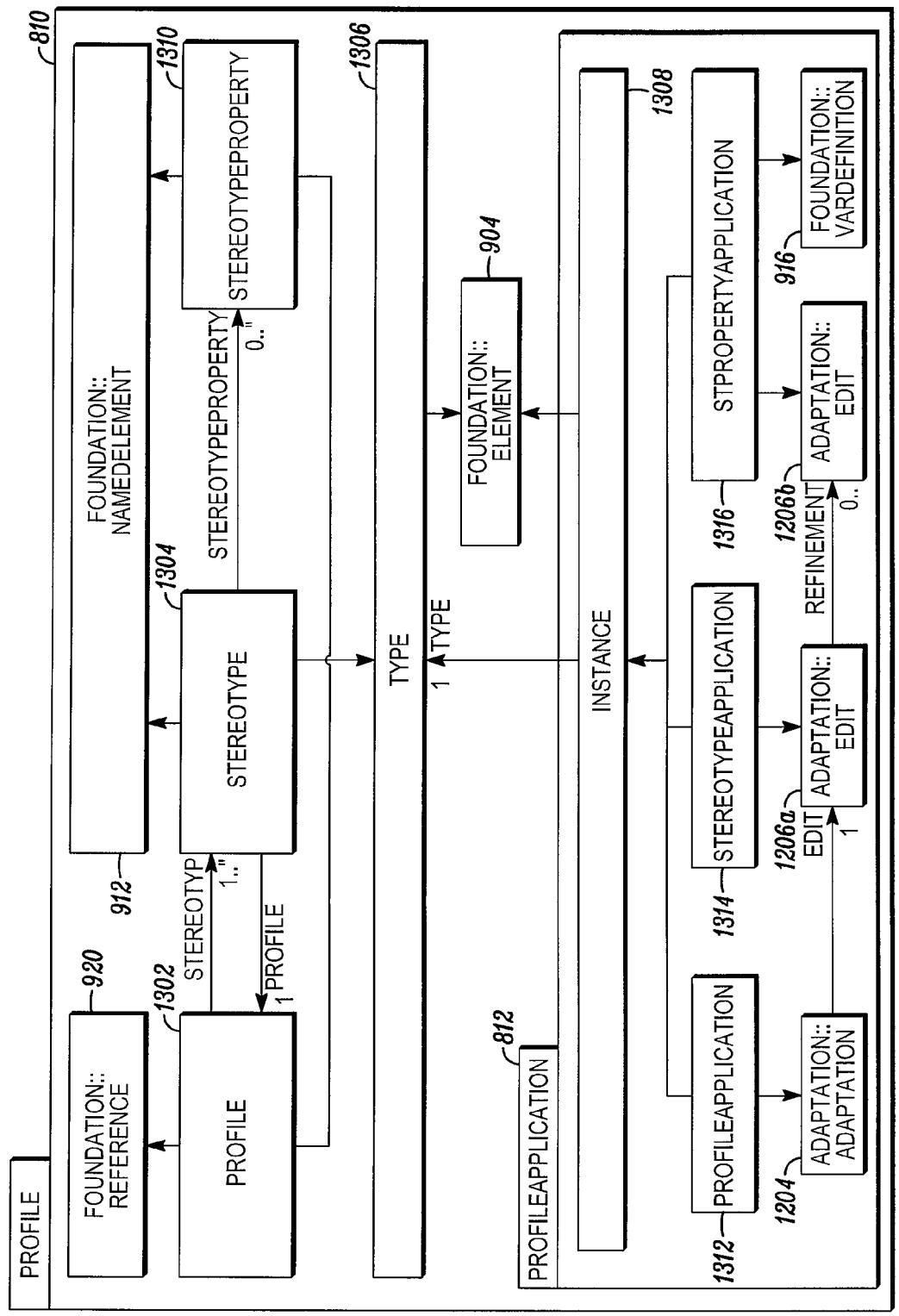
FIG. 13 is a block diagram of the profile package and the profile application package of FIG. 8.

FIG. 13 is a block diagram of the profile package 810 and the profile application package 812 of FIG. 8. The outer package 810 contains concepts relating UML profiles in general as Profile 1302 and Stereotype 1304. The application package 812 contains concepts relating to the application of profiles, i.e., their integration into UML models in MOF-M1.

Two concepts in the two packages 810, 812 include profile::Type 1306 and profile::profileApplication::Instance 1308. An Instance 1308 of a meta layer n is always related to a Type of the meta layer n+1. Transferred to the MOF-meta layers, this capability of the example DSL may be applied to virtually any meta layers. Hence, the example DSL may be used to query and edit through profile application MOF-M3 models as well as UML (e.g., MOF-M2, as described above).

Further in the package profile 810, the meta classes Profile 1302, Stereotype 1304, and StereotypeProperty 1310 may be considered to be types, which refer to generalisation relationships. The meta classes ProfileApplication 1312, StereotypeApplication 1314, and StPropertyApplication 1316, which are included in the profile::profileApplication package 812, constitute Instances.

The meta class Profile 810 may be considered to be an example/instance of the foundation::Reference package 920, as shown. As such, the profile package 1302 may be used as a reference, e.g. in semantic queries or during the edit (here profile application) process of the query result set. The profile application 1302 may inherit the capabilities defined with/as foundation::Reference 920 of including a foundation::ResourceWrapper 922 as described above.

The Profile metaclass may include one to many Stereotype 1304, which belong to foundation::NamedElement 912. For example, a stereotype 1304 may reference its owner, the Profile 1302 (see association end name Stereotype::profile). The capability defined in adaptation::Adaptation may be reused in ProfileApplication. StereotypeApplication 1304 and StPropertyApplication 1306 inherit from adaptation::Edit 1206. Hence, they may be used to edit UML model elements. The difference between both in the role of adaptation::Edit 1206, however, relies in the association named adaptation::Edit::refinement as depicted in FIG. 13 (e.g., depicted between the adaptation::Edit 1206a and the adaptation edit 1206b). Hence, a stereotype property may differ from a stereotype in that the former one is used as a refinement of the later. In terms of an AST, StereotypeApplication represents a composite node that can consist of StPropertyApplication. The latter one constitutes a leaf node.

StPropertyApplication 1316 is also foundation::VarDefinition 916, and, thus, reuses its capabilities. As a consequence, StPropertyApplication can contain Expressions, e.g. QueryExpressions, as described below.

Figure 14A:
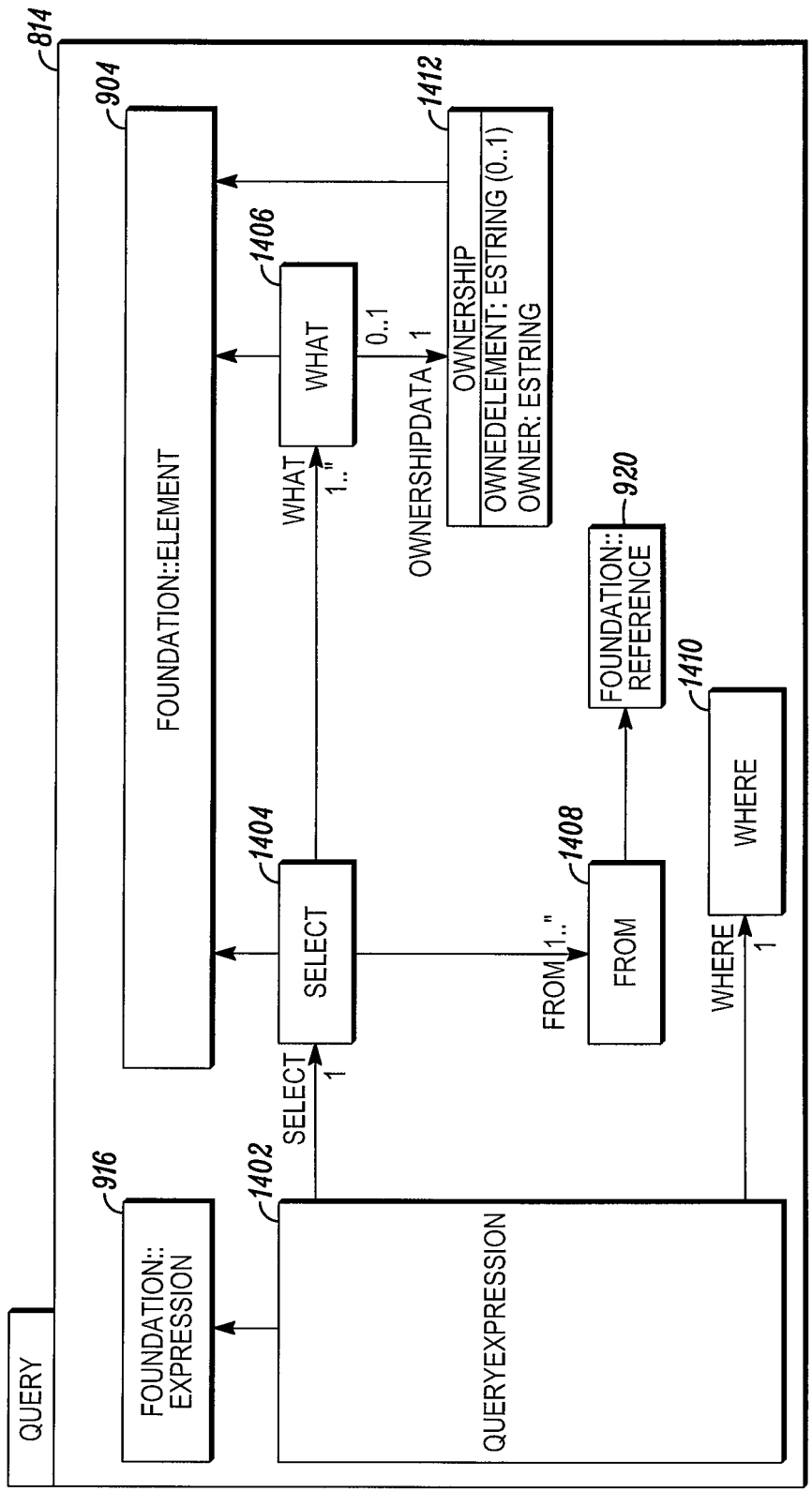
FIGS. 14A and 14B are block diagrams of the query package of FIG. 8.
Figure 14B:
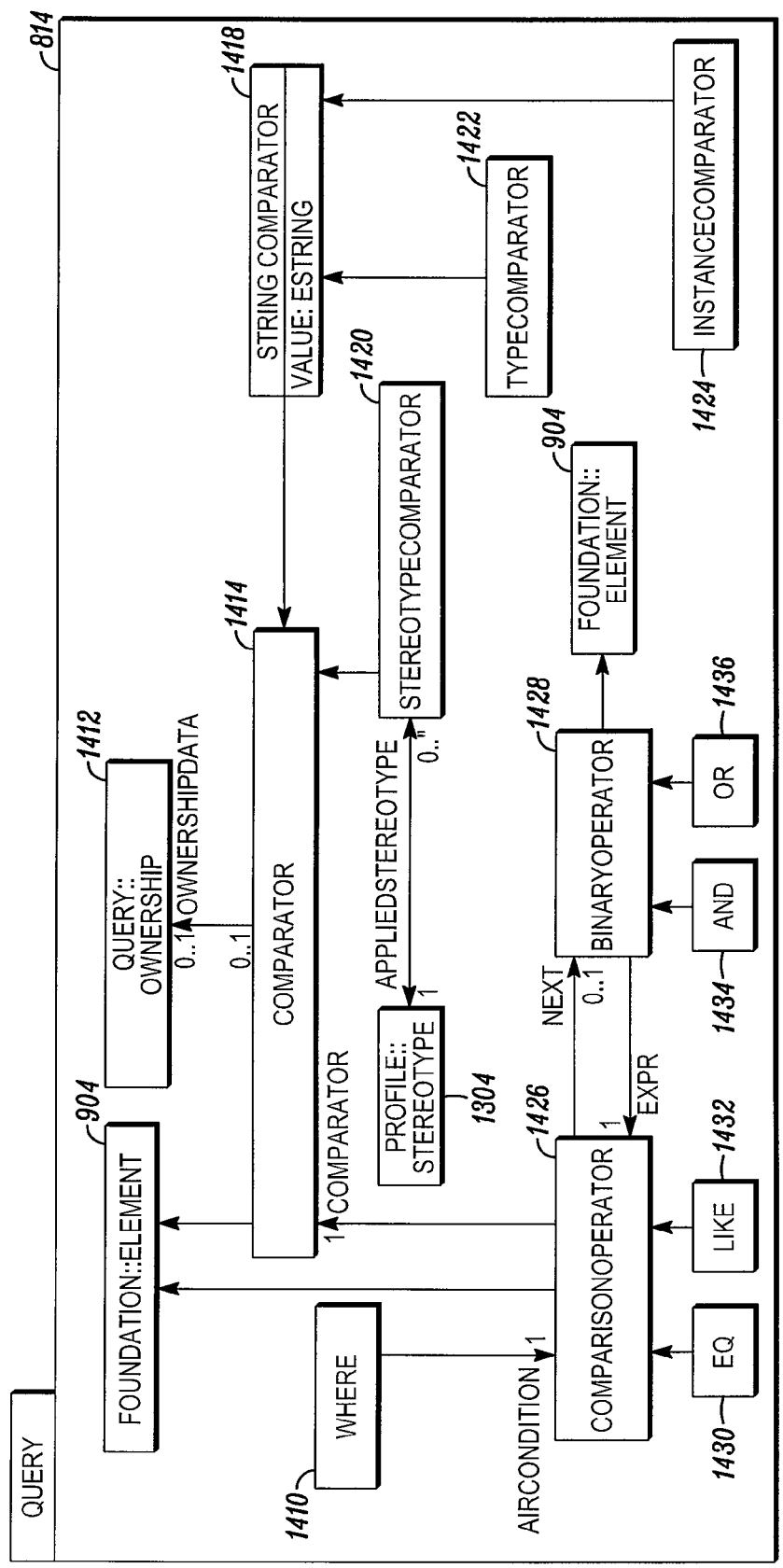

The package query 814 is illustrated in FIG. 14A (showing a first part of the query package) and FIG. 14B (showing a second part of the query package). The package(s) query 814 may provide various features, e.g., syntactic queries that are related to SQL. It may include concepts used in order to define queries of different types as syntactic and semantic queries.

Meta classes may include QueryExpression 1402, which represents the root meta class of the package 814. It contains all other meta classes of this package, either directly or indirectly. Its primary purpose is to define a query expression. A QueryExpression may include a Select 1404 as well as of a Where 1410 element. The purpose of Select 1404 is to specify what needs to be considered in the query (see What 1406) and where the data come from (see From 1408). To this end, Select 1404 contains one to many What blocks 1406.

The related meta class OwnerShip 1412 may be used in What 1406 as to specify the owner as well as the owned element in an instance of a What element. For instance, when selecting activity nodes, the property OnwerShip::owner would include the value Activity. The owner may then optimise the query in the future.

In FIG. 14A, OwnerShip::ownedElement 1412 is optional as its multiplicity is 0 . . . 1. If only the OwnerShip::owner is specified, OwnerShip::ownedElement 1412 may be inferred from the Where block 1410, as described below. With the example DSL, it is possible to select different types of model elements in one single query, as already described. For instance, a UML Class can be selected within the same query along with an Activity. This capability may be provided by the association end named Select::what 1406 that has the multiplicity of 1 to n.

In addition to indicating with What 1406 which elements are of interest in the query, it is also useful to reference the models that must be considered in the query. To this end, the concept of From 1408 may be used. Then, for each model, one From is required (see also association end name Select::from). A From is a foundation::Reference 920, as shown. As a consequence, it can be used to declare logical references to one to many models in one query.

Having defined the types of model elements that are of interest in the query as well as the models that must be considered in the query, the conditions can be defined. To this end, Where 1410 is defined, and may be used to specify the condition(s) of a query (QueryExpression 1402). Three different types of comparators 1414 are supported in the Where block 1410, i.e., syntactic, type-level as well as semantic comparators. The corresponding abstract syntax model is depicted in FIG. 14B.

Specifically, in FIG. 14B, Where 1410 contains an initial condition which is of type ComparisonOperator 1426 (with reference to the association end named Where::initCondition in FIG. 14B). The ComparisonOperator 1426 uses a Comparator 1414 for comparing a source element with a target element. The nature of the source element as well as of the target element can vary depending on the concrete Comparator 1414 that is used (e.g., see association end name ComparisonOperator::comparator).

EQ 1430 and Like 1432 represent concrete Boolean expressions. The concept of an equal in the DSL is to compare a source element's value with a given static value. Equal comparison can be performed with any of the direct or indirect concrete subtypes of Comparator that have been defined. These may include StereotypeComparator 1420, TypeComparator 1422, as well as InstanceComparator. 1424. They are applied, for example, to compare a source model element's value with the static string value that is provided by the user of the language in the DSM. The static value is modelled in the property StringComparator::value 1418. The source element data is included in OwnerShip 1412, described above. The source element's value depends on the nature of the current model element used. For instance, if the name of a Node is compared with a String value, then the OwnerShip:: owner may include Node and OwnerShip::ownedElement would include name. This is an instance-level query, as the value of Node::name varies in each instance of the type Node (see, e.g., meta class InstanceComparator 1424). It is possible to compare the type of a model element with a String value. In this example, OwnerShip::owner would be the only property that might be filled in case of TypeComparator.

StereotypeComparator 1420 may be used to evaluate if a stereotype has been applied to a source model element. It references the meta class profile::Stereotype$_{13}$. The corresponding profile name is carried in profile:Profile (with reference to the association end named profile::Stereotype::profile in FIG. 13)

The operator Like 1432 provides regular expression capabilities. It can, therefore, be used with the meta class InstanceComparator 1424. The value of StringExpression::value may be constrained with the following regular expression capabilities in case Like is applied as a ComparisonOperator 1426, which itself may be applied as a binary operator 1428 using Boolean operations such as And 1434 or Or 1436.

For example, the capability for zero or many occurrences of virtually any word character may not be supported. As a shorthand for the present example, a star may be used in the abstract syntax model. This has not, however, inherently need to be matched with the wildcard character that is used for the concrete syntax of the DSL. With this capability, zero or one occurrences of any word character are supported. As a shorthand, a question mark is used in the abstract syntax model.

In general, the process(es) of, e.g., FIG. 5 illustrating operations of the system 100 of FIG. 1, may be appreciated in the context of the above-described DSL language packages. For example, to process the DSM from the DSM repository 124, the query may be executed. For example, the referenced UML models graphs may be traversed in order to execute the query. After finishing the query block, the profiles are applied as follows (i.e., the following constitutes an iteration).

Specifically, for each query result set, execute the corresponding profile application blocks, and, for each profile block, apply the profile. Profile application for the current set may include that, for each element of the current query result set for which the current above profile must be applied, a package may be located for which the current profile has already been applied. If and only if a package is not found, the first owner package of the current element of the set may be obtained and applied to the profile to this package.

For each stereotype block in the DSM that is included in the current profile block, apply the stereotype to the current element of the set. This may include the following actions. Specifically, the stereotype may be applied to the current element if it has not been applied already. For example, in a multi-staged refinement process of UML models with UML profiles, as an instance, a stereotype may previously have been applied as part of the step-wise refinement procedure described above. It is possible to overwrite existing values of that applied stereotype successively in such a process.

For each property of the stereotype block in the DSM, the stereotype property may be instantiated. This may include declaring it with the value defined in the DSM. Stereotype properties may be initialised not only with primitive types but with virtually any type that can be fetched from any UML model(s) with the query mechanism(s) supported by the DSL.

Figure 15:
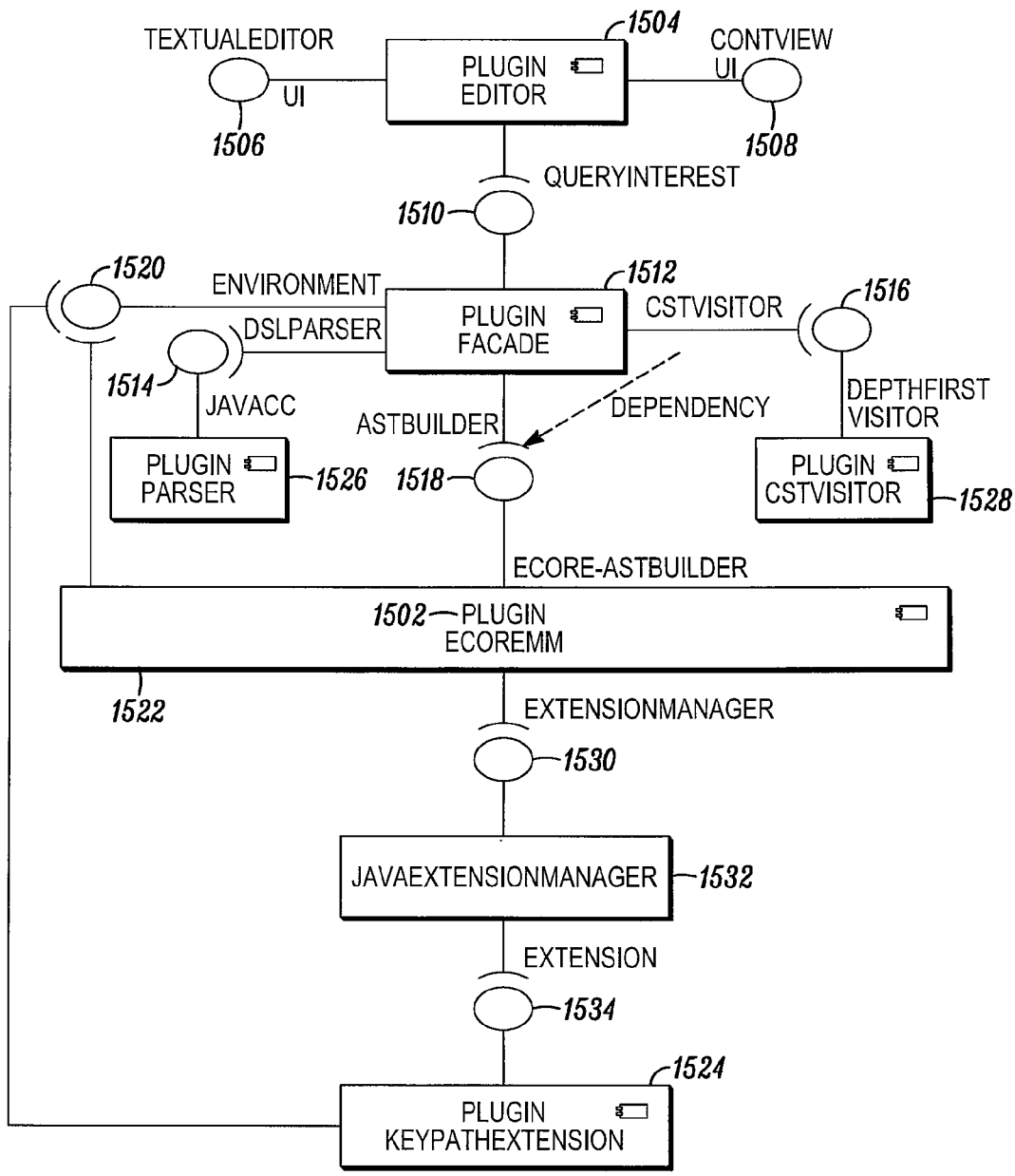
FIG. 15 is a block diagram of an architecture for executing the annotation engine that is configured to execute the DSL described above with respect to FIGS. 8-14A, 14B.

FIG. 15 is a block diagram of an architecture for executing the annotation engine 102 that is configured to execute the DSL described above with respect to FIGS. 8-14. In the example of FIG. 15, the modular units of the architecture may be implemented using the OSGI implementation of Eclipse. In OSGI, the modular units may be referred to as bundles. In Eclipse, these also may be referred to as plug-ins.

Thus, FIG. 15 illustrates primary components used in executing an embodiment of the annotation engine 102, as well as associated interfaces and connectors. Components that are plug-ins are indicated by the stereotype plug-in (e.g., 1502), in which case associated connectors may be constructed using the plug-in/bundle extension mechanism provided by Eclipse, and built at runtime.

In FIG. 15, editor 1504 represents a central interaction point with the user (e.g., the stakeholder(s) 130), and may be used to create the DSM with a textual editor, as illustrated by the textual editor interface 1506. Editor may be integrated into the overall Eclipse framework; e.g., may reuse the Eclipse editor and graphical facilities and may be extended with different editors and/or views, e.g. an outline view for a DSM editor. The DSM may use logical reference names to refer to DSM models, which may be mapped to physical resources (e.g., the model repository 104, and/or the profile repository 108) in a configuration view 1508. Specifically, the configuration information may be defined in the configuration view 1508 of the DSM that is also provided by the Editor, as shown.

In order to keep the dependencies among the plug-ins low, communication crossing Eclipse plug-ins may be established using extension points to build connectors among the plug-ins, e.g., an extension point interface QueryInterest 1510 as shown in FIG. 15. Meta data for the QueryInterest interface 1510 may include an eXtensible Mark-up Language (XML) schema by which, for example, listeners are registered and according to which message formats are defined for the listeners to, e.g., register with the editor 1504.

The QueryInterest interface 1510 is provided by the component Facade 1512, which provides a central place for the control flow that is triggered by the QueryInterest interface 1510 when the user wants the DSM to be executed. In addition to implementing the process, the facade 1512 may minimize dependencies between other components. This minimization may be observed in FIG. 15, inasmuch as facade 1512 exposes compiler- or interpreter-specific required interfaces, such as DSLParser 1514, Visitor 1516, or ASTBuilder 1518, that the other components implement.

As already described, the provided interfaces may be connected through the Eclipse's plug-in extension mechanism. For example, such techniques may be used for binding facade 1512 to the interface QueryInterest interface 1510 that is required by Editor 1504. Besides the binding that is technically achieved with Eclipse, the lower components may be isolated from details related to the Eclipse workbench APIs. Consequently, for example, all environmental information, e.g. a uniform resource identifier (URI) referring to the Eclipse workspace that may be used during the parsing of the DSL, may be encapsulated by an Environment interface 1520 that may be implemented by facade 1512. As seen in FIG. 15, this interface 1520 may be used by the components EcoreMM 1522 and KeyPathExtention 1524.

During execution, a user may make a specific selection in the DSM editor 1504, which iterates over the registered QueryInterest interface(s) 1510. For each listener, the QueryInterest interface calls an update method so that, through the interface 1510, facade 1512 obtains control of the execution through its registration as a listener (at this point, the only listener registered in events related to the DSM editor). Each registered listener gets the data that is necessary, e.g. information about the environment, the DSM program as raw text, as well as the configuration options that map logical references to, e.g. UML models, to physical references (e.g., URIs).

Then, facade 1512 may use the DSLParser interface 1514 as implemented by Parser 1526 which provides a parser implementation based on JavaCC. After parsing the DSM, the concrete syntax tree (CST) may become available. Then, the CST is handed over to the CSTVisitor interface 1516 for the CSTVisitor 1528. The responsibility of CSTVisitor interface 1516 is to visit the nodes of the CST systematically. It implements the tree-traversing algorithm known as depth-first walker. During the traversing, it calls operations of the ASTBuilder 1518 at appropriate places (as shown by its dependency relationship to ASTBuilder 1518 in FIG. 15).

The AST may be too complex to build in one run, e.g. by using a factory method in CSTVisitor after having visited all the nodes of the CST. Instead, the AST may be built incrementally, at appropriate places during the traversing of the CST. This is achieved by implementing the builder pattern, which is a pattern that can be used to build a complex structure (here AST) incrementally by building parts of it iteratively. The role Director(Builder) of the builder pattern may be played by implementations of the CSTVisitor 1528 as the ASTBuilder. The AST may then be built and interpreted within the component EcoreMM 1522.

During the interpretation of the AST, extensions may occur. To this end, the interface ExtensionManager 1530 may be used by EcoreMM 1522. For example, a Java-based extension manager 1532 may be implemented, with the responsibility to call extensions that are implemented in the language Java (the JavaExtension Manager 1532 may not be implemented as a plugin, so that the incoming connector that binds the required interface ExtensionManager 1530 of the component EcoreMM 1522 with the provided interface of the component JavaExtenionManager may be built statically). The extensions points are declared in the interface Extension 1534. An extension corresponds to an operation call in the Java domain. For instance, the operation Extension::afterStereotypeExtension(..) may be called on the plugins that register for the interface Extension in the component JavaExtensionManager. An example implementation provided above is the KeyPathExtension 1524, which, as already described, may be used in various performance scenarios. Through the interface Extension 1534 any registered plugin can be called in a controlled manner before and/or after interpreting a model element of the DSM.

Figure 16:
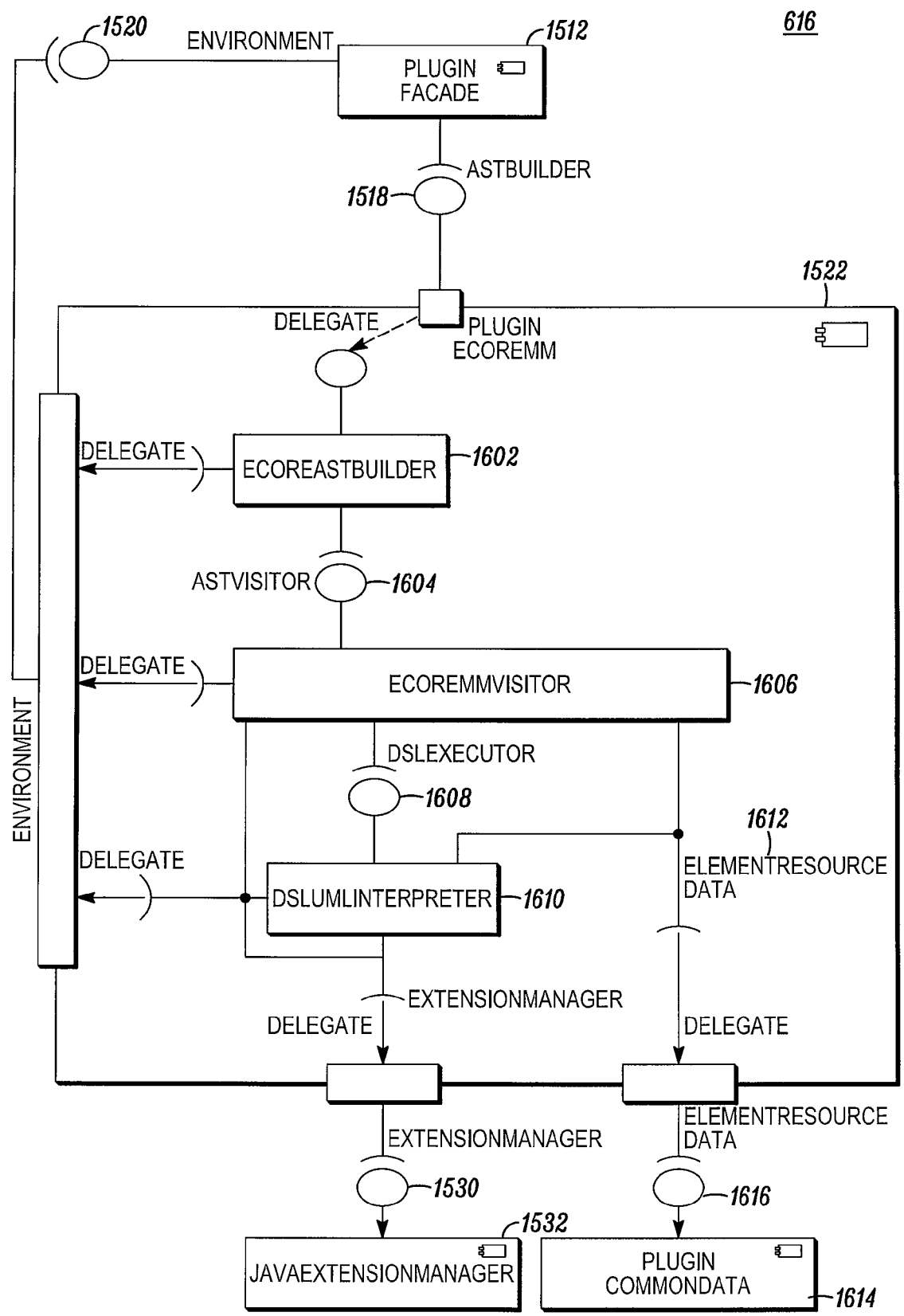
FIG. 16 is a block diagram illustrating the component EcoreMM of FIG. 15

FIG. 16 is a block diagram illustrating the component EcoreMM 1522 of FIG. 15 (and its environment) in more detail. In FIG. 16, it may be seen that the component EcoreMM contains classes and/or components that are specific to Ecore. Other types of components with identical interfaces might be based on MOF or other meta modelling technology. Component facade 1512 uses the ASTBuilder interface 1518 to access the EcoreMM component 1522.

FIG. 16 provides further information regarding the creation of the AST. For instance, when during the traversing of the CST in component CSTVisitor 1528 of FIG. 16, a program block is about to begin (end), the operation ASTBuilder::beginProgram(..)/(ASTBuilder::endProgram(  )) may be called. The different states among the operation calls of the interface ASTBuilder 1518 are not stored in disparate instance variables with the implementation EcoreASTBuilder 1602 of FIG. 16; instead, only one instance variable is used, a stack which contains the current state of the visitor and/or builder. In disparate operations of ASTBuilder 1518 the current state is pushed onto or removed from the top of the stack in EcoreASTBuilder 1602.

After the AST has been built, a visitor of the AST may be triggered in order to use the AST, the responsibility for which may fall to the interface ASTVisitor 1604. An EcoreMMVisitor 1606 may be used to as in implementation of the interface ASTVisitor 1604, e.g., as an Ecore-based implementation of the depth-first algorithm (referenced above) for visiting the AST. As needed, this component may call the corresponding methods of the interface DSLExecutor 1608, the purpose of which may be to execute the DSM.

DSLUMLInterpreter 1610 is an interpreter-based implementation of the DSLExecutor interface. DSLUMLInterpreter 1610 and EcoreMMVisitor 1606 may use data that might conceptually be common among many (future) plugins. The resource information related to an element of the query result may be used during the interpretion of the DSM (see, e.g., interface ElementResourceData 1612). In addition, some implementations of the interface ExtensionManager 1530 may use this information. To this end, common data may be included in the plugin CommonData 1614 by way of interface ElementResourceData 1616. The interface ExtensionManager 1530 may be used by DSLUMLInterpreter 1610 and EcoreMMVisitor 1606. Corresponding operations of that interface may be called in places in the DSM.

Figure 17:
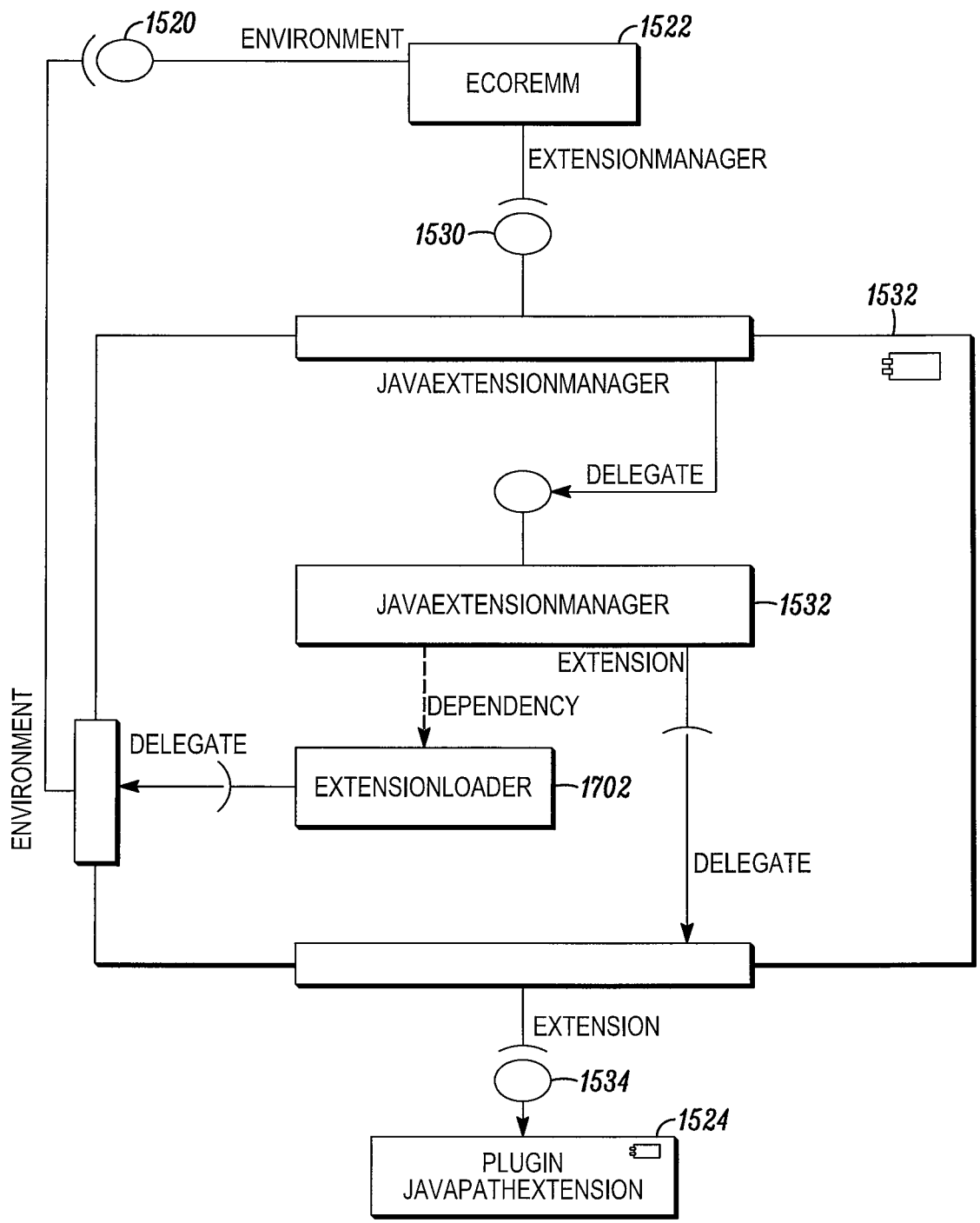
FIG. 17 is a block diagram of the component JavaExtensionManager of FIG. 15 along with its environment.

FIG. 17 is a block diagram of the component JavaExtensionManager 1532 along with its environment JavaExtensionManager 1532 provides the interface ExtensionManager 1530 for calling extension points. It implements this capability for the Java language in which the functionality for extension points can be implemented. To this end, the interface Extension 1534 may be used. For instance, if a Web service-based extension manager would be implemented, it would require a WSDL interface for calling extensions (similar to Extension 1534). Two extension operations may be defined. One may be used to call Java operations as extension points after a stereotype has been applied. The other one is used likewise for after the application of a profile; however, conceptually, the DSL is not restricted to these two types of extension calls. ExtensionLoader 1702 loads the registered extensions. It may use the interface Environment 1520 to obtain meta data on the DSM program, e.g. the directory, or its file path relative to the Eclipse workspace. Two examples of how to register extensions for a DSM are either to specify an extension implementation for each DSM-file that is of interest to that extension individually, or to specify an extension implementation for the directory containing all relevant DSMs.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program that might implement the techniques mentioned above might be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A system for querying and modifying one or more models associated with one or more software applications, the system comprising:
    at least one processor;
    a non-transitory computer-readable medium including instructions, when executed by the at least one processor, are configured to implement:
    an annotation engine configured to receive, via a query interface, parameters for performing a vertical annotation in terms of which model elements to search and which profile meta-model to vertically integrate with the model elements, the vertical annotation indicating a query search of a model repository across a single domain;
    a query interpreter configured to query the model repository storing a plurality of models based on the parameters for performing the vertical annotation including obtaining a first element and a second element of at least one model, the first element and the second element being within a same domain;
    a profile reader configured to read, from a profile repository storing a plurality of profile meta-models, a vertical profile meta-model that is a technology-specific implementation of the first element and the second element based on the parameters for performing the vertical annotation, and return the vertical profile meta-model for automatic vertical integration with each of the first element and the second element; and
    a profile integrator configured to automatically modify each of the first element and the second element with the vertical profile meta-model to obtain an annotated model in response to an annotation selection including adding meta-data from the vertical profile meta-model to class elements of each of the first element and the second element associated with the at least one model, wherein the profile integrator is configured to return the annotated model, the returned annotated model subjected to a process for performing a horizontal annotation operative based on a query search across multiple domains;
    the annotation engine configured to receive, via the query interface, parameters for performing the horizontal annotation in terms of which model elements to search and which profile meta-model to horizontally integrate with the model elements;
    the query interpreter configured to query the model repository to obtain the first element and a third element based on the parameters for performing the horizontal annotation, the third element being in a domain different than the first element;
    the profile reader configured to read from the profile repository a horizontal profile meta-model based on the parameters for performing the horizontal annotation, the horizontal profile meta-model relating to security or performance; and
    the profile integrator configured to automatically modify each of the first element and the third element with the horizontal profile meta-model to obtain a secondary annotated model, and return the secondary annotated model for implementation of at least one software application or further modifications.

2. The system of claim 1 wherein the first element and the second element share a model property, and the query interpreter is configured to query the plurality of models within the model repository using a single query.

3. The system of claim 1 wherein the first element and the second element share a common name, and the query interpreter is configured to receive a syntactic characterization of the model elements, and to query the model repository to obtain the first element and the second element based on the syntactic characterization including selecting the first element and the second element associated with the common name.

4. The system of claim 1 wherein the query interpreter is configured to receive a semantic characterization of the model elements, and to query the model repository to obtain the model elements based on the semantic characterization including selecting the first element and the second element associated with a common name included in a reference to the vertical profile meta-data model in which a functionality of the common name is defined.

5. The system of claim 1 wherein the query interpreter is configured to receive a type-level characterization of the first element and the second element, and to query the model repository to obtain the first element and the second element based on the type-level characterization including selecting the first element and the second element sharing an equivalent type.

6. The system of claim 1 wherein the at least one model is provided according to a modeling language, and wherein the profile reader is configured to read the vertical profile meta-model or the horizontal profile meta-model and to create a profile model therefrom.

7. The system of claim 1 wherein the query interpreter is configured to query the model repository using a domain specific language (DSL), and the system further includes an extension manager configured to perform at least one additional modification of the annotated model using a non-domain specific language providing one or more extensions to the DSL.

8. The system of claim 1, wherein the horizontal profile meta-model includes a performance profile meta-model having meta-data corresponding with one or more probabilities of execution, and the profile integrator is configured to modify the first element and the third element with the one or more probabilities of execution specified by the performance profile-meta-model.

9. The system of claim 1, wherein the horizontal profile meta-model includes a security profile meta-model having meta-data corresponding to encryption, authentication, or authorization information, and the profile integrator is configured to modify the first element and the third element with the encryption, authentication, or authorization information specified by the security profile meta-model.

10. A method for querying and modifying one or more models associated with one or more software applications, the method comprising:

receive, via a query interface, parameters for performing a vertical annotation in terms of which model elements to search and which profile meta-model to vertically integrate with the model elements, the vertical annotation indicating a query search of a model repository across a single domain;

querying, including the at least one processor, the model repository storing a plurality of models based on the parameters for performing the vertical annotation including obtaining a first element and a second element of at least one model, the first element and the second element being within a same domain;

reading, including the at least one processor, from a profile repository storing a plurality of profile meta-models, a vertical profile meta-model that is a technology-specific implementation of the first element and the second element based on the parameters for performing the vertical annotation, and returning the vertical profile meta-model for automatic vertical integration with each of the first element and the second element;

automatically modifying, including the at least one processor, each of the first element and the second element with the vertical profile meta-model to obtain a vertically annotated model in response to an annotation selection including adding meta-data from the vertical profile meta-model to class elements of each of the first element and the second element associated with the at least one model; and returning, including the at least one processor, the vertically annotated model, and subjecting the vertically annotated model to a process of performing a horizontal annotation operative based on a query search across multiple domains;

receiving, via the query interface, parameters for performing the horizontal annotation in terms of which model elements to search and which profile meta-model to horizontally integrate with the model elements;

querying, including the at least one processor, the model repository to obtain the first element and a third element based on the parameters for performing the horizontal annotation, the third element being in a domain different than the first element;

reading, including the at least one processor, from the profile repository a horizontal profile meta-model based on the parameters for performing the horizontal annotation, the horizontal profile meta-model relating to security or performance; and automatically modifying, including the at least one processor, each of the first element and the third element with the horizontal profile meta-model to obtain a secondary annotated model, and returning the secondary annotated model for implementation of at least one software application or further modifications.

11. A non-transitory computer program product tangibly embodied on a computer-readable medium and including executable code that, when executed, is configured to cause a system for querying and modifying one or more models associated with one or more software applications to:

perform a vertical annotation within a single domain including:
  receive, via a query interface, parameters for performing a vertical annotation in terms of which model elements to search and which profile meta-model to vertically integrate with the model elements, the vertical annotation indicating a query search of a model repository across the single domain;
  query the model repository storing a plurality of models based on the parameters for performing the vertical annotation including obtaining a first element and a second element of at least one model from the model repository, the first element and the second element being within a same domain;
  read, from a profile repository storing a plurality of profile meta-models, a vertical profile meta-model that is a technology-specific implementation of the first element and the second element based on the parameters for performing the vertical annotation, and return the vertical profile meta-model for automatic vertical integration with each of the first element and the second element;
  automatically modify each of the first element and the second element with the vertical profile meta-model to obtain an annotated model in response to an annotation selection including adding meta-data from the vertical profile meta-model to class elements of the first element and the second element associated with the at least one model; and
  return the annotated model to be subjected to further modification; and perform a horizontal annotation indicating a query search across multiple domains including:
  receive, via the query interface, parameters for performing the horizontal annotation in terms of which model elements to search and which profile meta-model to horizontally integrate with the model elements;
  query the model repository to obtain the first element and a third element based on the parameters for performing the horizontal annotation, the third element being in a domain different than the first domain;
  read, from the profile repository, a horizontal profile meta-model related to performance or security based on the parameters for performing the horizontal annotation, and return the horizontal profile meta-model for automatic horizontal integration with each of the first element and the third element;
  automatically modify each of the first element and the third element with the horizontal profile meta-model to obtain a secondary annotated model in response to a secondary annotation selection; and
  return the secondary annotated model for implementation of at least one software application or further modifications.

12. The computer program product of claim 11 wherein the executable code includes one or more extensions to a domain specific language that defines a domain specific model, the one or more extensions including a non-domain specific language, wherein the one or more extensions provide for at least one additional modification of the annotated model or the secondary annotated model.

13. The computer program product of claim 11 wherein the at least one model includes a Unified Modeling Language (UML) model.

14. The computer program product of claim 11 wherein the at least one model includes a Meta-Object Facility (MOF) layer MOF-3, MOF-2, or MOF-1, and wherein the vertical profile meta-model includes a lower layer of the MOF than the at least one model.

* * * * *